(12) United States Patent
Choi et al.

(10) Patent No.: US 9,698,390 B2
(45) Date of Patent: Jul. 4, 2017

(54) EXTREMELY DEFORMABLE STRUCTURE AND LITHIUM SECONDARY BATTERY MADE THEREFROM

(71) Applicant: KOREA INSTITUTE OF SCIENCE AND TECHNOLOGY, Seoul (KR)

(72) Inventors: Insuk Choi, Seoul (KR); Kee-Bum Kim, Seoul (KR); Kyu Hwan Oh, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 57 days.

(21) Appl. No.: 14/991,301

(22) Filed: Jan. 8, 2016

(65) Prior Publication Data

US 2016/0204390 A1    Jul. 14, 2016

(30) Foreign Application Priority Data

Jan. 8, 2015 (KR) ........................ 10-2015-0002940

(51) Int. Cl.
*H01M 2/02* (2006.01)
*H01M 10/0525* (2010.01)
(Continued)

(52) U.S. Cl.
CPC ........... *H01M 2/0202* (2013.01); *H01M 2/22* (2013.01); *H01M 10/058* (2013.01);
(Continued)

(58) Field of Classification Search
CPC .... H01M 2/0202; H01M 2/22; H01M 10/058; H01M 10/0525; H01M 2002/0205; H01M 2220/30; H01B 5/14
See application file for complete search history.

(56) References Cited

U.S. PATENT DOCUMENTS 7,678,440 B1      3/2010 McKnight et al.
9,479,699 B2 *   10/2016 Brown ............... F03G 7/065
(Continued)

FOREIGN PATENT DOCUMENTS

JP    2008-269851 A    11/2008
KR    10-1476341 B1    12/2014

OTHER PUBLICATIONS

Korean Office Action dated May 13, 2016; Appln. No. 10-2015-0002940.

*Primary Examiner* — Stewart Fraser
(74) *Attorney, Agent, or Firm* — Ladas & Parry LLP

(57) ABSTRACT

The present disclosure relates to an extremely deformable structure comprising a basic displacement unit having an embedded form, in which m polygonal basic unit cells are disposed adjacent to each other, m separation parts are formed among the m basic unit cells, a junction part connecting the basic unit cells to each other is formed between the basic unit cells in which the junction part has a junction part pattern in which an external junction part disposed at the outer portion of the basic unit cell and an internal junction part which is not in contact with the outer portion of the basic unit cell are sequentially repeated, and the relative positions of the m basic unit cells are changed according to the junction part pattern, and thus, are activated (here, m is an integer of 4 or 6). Further, the present disclosure relates to a lithium secondary battery made from the extremely deformable structure.

12 Claims, 35 Drawing Sheets

(51) Int. Cl.
*H01M 2/22* (2006.01)
*H01M 10/058* (2010.01)
*H01B 5/14* (2006.01)

(52) U.S. Cl.
CPC ........... *H01M 10/0525* (2013.01); *H01B 5/14* (2013.01); *H01M 2002/0205* (2013.01); *H01M 2220/30* (2013.01)

(56) References Cited

U.S. PATENT DOCUMENTS

| | | | |
|---|---|---|---|
| 9,496,582 B1* | 11/2016 | Lim | H01M 10/0436 |
| 9,502,734 B1* | 11/2016 | Lim | H01M 10/0436 |
| 2010/0330338 A1 | 12/2010 | Boyce et al. | |
| 2015/0237711 A1* | 8/2015 | Rogers | H05K 1/028 |
| | | | 174/251 |
| 2015/0373831 A1* | 12/2015 | Rogers | H01L 23/22 |
| | | | 429/121 |
| 2016/0037633 A1* | 2/2016 | Downs | B32B 5/12 |
| | | | 361/749 |
| 2016/0101594 A1* | 4/2016 | Tibbits | B32B 27/12 |
| | | | 428/64.1 |
| 2017/0092389 A1* | 3/2017 | Choi | H01B 5/14 |

* cited by examiner

EXTREMELY DEFORMABLE STRUCTURE AND LITHIUM SECONDARY BATTERY MADE THEREFROM

CROSS-REFERENCE TO RELATED APPLICATION

Pursuant to 35 U.S.C. §119(a), this application claims the benefit of earlier filing date and right of priority to Korean Application No. 10-2015-0002940, filed on Jan. 8, 2015, the contents of which is incorporated by reference herein in its entirety.

BACKGROUND OF THE DISCLOSURE

1. Field of the Disclosure

The present disclosure relates to an extremely deformable structure having an embedded form by using a hierarchical structure, and a lithium secondary battery made therefrom.

2. Background of the Disclosure

Most materials have an inherent form which is optimized for the properties and functions of the material. However, some materials also lose some functions by a specific stimulus, and an appearance thereof also is deformed.

When the structural and morphological characteristics of a material are deformed by a specific external stimulus, such as external force or temperature, the structure thereof is determined to be unstable from the conventional mechanical viewpoint, and thus, is considered as a kind of malfunction.

On the contrary, a material such as a shape memory alloy remembers the original shape thereof even though being deformed by applying force thereto, and thus, has a characteristic that the material is returned to the original shape when heat is added thereto such that the material reaches a specific temperature or more. Specifically, when a condition of a predetermined temperature or more is satisfied, the shape of the material itself is deformed while the arrangement of the embedded crystals which the material itself has is deformed. From the mechanical viewpoint, the shape memory alloy may be evaluated as an unstable material which fails to maintain a standardized shape under a specific environment. However, when these characteristics are utilized, the material may be usefully utilized in various fields such as artificial organs, or medical apparatuses such as a bone-setting plate for orthopedics, or fire alarms.

Stem cells are undifferentiated cells having an ability to be differentiated into various body tissues. Moreover, stem cells have so-called totipotency characteristics that the cells may be grown into any organs in the human body when a predetermined condition is satisfied.

Meanwhile, while various electronic devices such as a computer, a mobile phone, and a television set are repeatedly developed, devices used in an electronic product such as a display device or an energy device are improved in performance and thinned. Further, recently, efforts to not only manufacture devices which just are thin and have high performance, but also implement characteristics, such as ductility, flexibility, stretchability, and wrinkable properties, which are difficult to implement using conventional devices have been continuously conducted.

SUMMARY OF THE DISCLOSURE

An object of the present disclosure is to provide a structure whose appearance and configuration such as ductility, flexibility, stretchability, and wrinkable properties may be 2-dimensionally and 3-dimensionally deformed without limitation by the external stimulus as described above.

Another object of the present disclosure is to provide a lithium secondary battery made of a structure whose appearance and configuration may be 3-dimensionally deformed without limitation by the external stimulus.

In the present disclosure, the term "extremely deformable structure" may be used interchangeably with the term "shape conversion structure", and may also be used to mean "a structure which may be extremely deformed 2-dimensionally and 3-dimensionally". In addition, as a characteristics of the "extremely deformable structure", the operating performance is maintained without any change before and after the structure is extremely crumpled, and the term "reversibly wrinkable" may also be used in order to mean that the structure is freely returned to the initial state.

Hereinafter, unless specially mentioned, the case where the distance between the unit cells becomes large so that the structure has a form which used to be embedded will be described as an active state, and the case where the distance between the unit cells is minimal will be described as a latent state.

Furthermore, unless specially mentioned in the present disclosure, a so-called displacement or deformation includes not only a 2-dimensional change, but also a 3-dimensional change, of a structure.

Hereinafter, in order to exhibit constituents (a separation structure, a unit cell, a displacement unit, and the like) constituting the same dimension in a hierarchical structure, a term such as basic and (primary) to (n-th) order will be together used. Further, when constituents of the dimensions different from each other are ail referred to, or a general characteristic of the constituent is described, the title of each of the constituents is only used.

In addition, the term "include", "have" or "comprise" is intended to indicate the presence of the characteristic, number, step, operation, constituent, part or any combination thereof described in the specification, and should be understood that the presence or addition possibility of one or more other characteristics or numbers, steps, operations, constituents, parts or any combination thereof is not pre-excluded.

The term "cell unit" or "partial unit" is used to mean that specific constituents of a lithium secondary battery described in the description are conceptually encompassed for convenience of description, and should be understood to be irrespective of a unit in operating the lithium secondary battery.

Hereinafter, the present disclosure will be described in more detail.

An extremely deformable structure according to an exemplary embodiment of the present disclosure may include a basic displacement unit having an embedded form, in which m polygonal basic unit cells are disposed adjacent to each other, m separation parts are formed among the m basic unit cells, a junction part connecting the basic unit cells to each other is formed between the basic unit cells in which the junction part has a junction part pattern in which an external junction part disposed at the outer portion of the basic unit cell and an internal junction part which is not in contact with the outer portion of the basic unit cell are sequentially repeated, and the relative positions of the m basic unit cells are changed according to the junction part pattern, and thus, are activated (here, m is an integer of 4 or 6).

FIG. 1 is a view schematically illustrating a process in which the extremely deformable structure according to an exemplary embodiment of the present disclosure is changed from the latent state to the active state, and FIG. 2 is a conceptual view describing the name of each part by using, as an example, the case where a basic displacement unit included in the extremely deformable structure according to an exemplary embodiment of the present disclosure has a tetragonal appearance and m=4.

As can be seen from FIGS. 1 and 2, the extremely deformable structure of the present disclosure are composed of a basic displacement unit. In the basic displacement unit, m polygonal basic unit cells are disposed adjacent to each other, and m separation parts are formed among the m basic unit cells.

The basic unit cells adjacent to each other while being separated from each other are connected to each other by a junction part. The junction part is composed of an external junction part disposed at the outer portion of the basic unit cell and an internal junction part which is not in contact with the outer portion of the basic unit cell, and the external junction part and the internal junction part are sequentially repeated to form a junction part pattern.

As can be clearly seen from FIG. 1, the configuration and entire appearance of the basic displacement unit are changed by the rotational movement in which the basic unit cells connected to each other around the junction part constituting the junction part pattern and the relative position movement between a plurality of unit cells derived from the rotational movement of each of the unit cells.

For convenience of discussion, FIG. 1 illustrates only an aspect of a 2-dimensional change, but the junction part may also be formed so as to be capable of being 3-dimensionally rotated. In such a case, the extremely deformable structure comprises so-called reversible wrinkability.

The upper view and lower view in FIG. 1 illustrate a basic displacement unit composed of four tetragonal basic unit cells and a basic displacement unit composed of six triangular basic unit cells, respectively.

The tetragonal displacement unit includes four separation parts therein and four unit cells including junction parts formed at one end of each of the separation parts. The shapes sequentially clockwise from the unit cell at the left upper portion are referred to as a unit $cell_1$ to a unit $cell_4$, and a separation part disposed between the unit $cell_1$ and the unit $cell_2$ is referred to as a separation $part_1$. Meanwhile, a junction $part_1$, which is a junction part formed at a portion in which the separation $part_1$ and the outer line of the displacement unit meet each other, has a form of an external junction part. On the contrary, the separation $part_2$ is disposed at the internal portion of the displacement unit, which is not in contact with the outer line of the displacement unit, and thus, has a form of an internal junction part.

The junction $part_1$ to junction $part_4$ have a form of any one junction part of the external junction part and the internal junction part, and are composed such that the external junction part and the internal junction part are repeated. This is a condition in which unit cells may be rotated and moved while the displacement unit is changed into an active state, meaning that two junction parts (junction parts with the same dimension, which are simultaneously in contact with one unit cell) adjacent to each other do not have a form of the same external junction part or internal junction part.

In FIG. 1, when a force is applied in a direction indicated by an arrow, the unit cells make a rotational movement in which the unit cells become distant from each other while rotating in an arrow direction indicated inside each unit cell. By such a rotational movement, an empty space is formed between the unit cells, and the entire appearance and/or size of the displacement unit are/is changed during the rotational movement.

By way of example, a basic structure of the displacement unit and a change appearing when the structure is changed into an active state will be described based on the displacement unit having a hexagonal appearance drawn in the lower portion of FIG. 1.

The hexagonal displacement unit includes six adjacent unit cells, six separation parts therein, and junction parts formed at one end of each of the separation parts. The junction parts connecting the adjacent unit cells have a form of a junction part in which an external junction part and an internal junction part are sequentially alternately formed, so that two junction parts in contact with one unit cell are different from each other. In FIG. 1, when a force is applied to the hexagonal displacement unit in an arrow direction, each of the unit cells is changed into an active state while making a rotational movement in an arrow direction indicated inside the unit cell, and when each of the unit cells is allowed to be as distant as possible, an empty space surrounded by the unit cells is formed in the unit structure, and the unit cell is finally deformed into a form on the farthest right.

Meanwhile, the extremely deformable structure of the present disclosure may be composed of an n-th order hierarchical structure including a (primary) displacement unit to an (n-th) order displacement unit (here, n is an integer of 2 or more).

The hierarchical structure means a structure formed by repeatedly adding the displacement unit including a unit cell and a junction part pattern. When the extremely deformable structure is formed to have a hierarchical structure while making the dimensions different as described above, as described in, for example, FIGS. 4 to 8, the extremely deformable structure appears to look like a tile pattern in which a predetermined pattern is formed on the surface of the extremely deformable structure in the latent state.

Meanwhile, the first part of the present specification describes a method of forming a hierarchical structure by repeatedly adding the displacement unit including a unit cell and a junction part pattern, but the extremely deformable structure may also have a so-called top-down hierarchical structure including a basic displacement unit including a basic junction part pattern and a basic unit cell structure, and an upper displacement unit including an upper junction part pattern each formed inside the basic displacement unit and formed so as to have an upper part pattern, and an upper unit cell structure.

FIG. 3 is a conceptual view for describing a junction part pattern of an extremely deformable structure having a secondary hierarchical structure, which is an extremely deformable structure (left side) in which the (primary) junction part pattern of a material having en embedded form according to an exemplary embodiment of the present disclosure is an alpha-type, and a (secondary) displacement unit with an alpha-type junction part pattern is added to the (primary) displacement unit; and an extremely deformable structure (right side) in which a (secondary) displacement unit with an alpha-type junction part pattern is added to a (primary) displacement unit with an beta-type (primary) junction part pattern.

Referring to FIG. 3, it can be seen that the entire form of a junction part pattern of an extremely deformable structure having a secondary or more hierarchical structure may vary depending on the difference in relative forms of the junction parts included in the (primary) junction part pattern and the (secondary) junction part pattern.

In the case of a displacement unit in which a hierarchical structure is not formed as in FIG. 1, the difference in embedded forms is shown by the relative position of an external junction part and an internal junction part, but in the case of an extremely deformable structure having a secondary or more hierarchical structure, it is differentiated whether junction parts included in each n-th order displacement unit and positioned at the corresponding position have the same junction part form, or junction part forms different from each other, and accordingly, the form of the extremely deformable structure in an active state may also vary.

For example, when the (secondary) junction $part_1$ to (secondary) $part_m$ which connect m (secondary) unit cells to each other have a junction part form in which an external junction part and an internal junction part are each disposed in the same direction as a position corresponding to the (primary) junction $part_1$ to (primary) junction $part_m$ which connect m (primary) unit cells to each other, both the (primary) junction part pattern and the (secondary) junction part pattern have an alpha-type junction part pattern; and when the junction parts have junction part forms different from each other, the (primary) junction part pattern has an alpha-type junction part pattern and the (secondary) junction part pattern has a beta-type junction part pattern.

Specifically, an extremely deformable structure in which the case where the junction part patterns each included in the (primary) displacement unit and the (secondary) displacement unit are the same as each other is differentiated from the case where the junction part patterns are different from each other and having a secondary or more hierarchical structure may be classified as at least two junction part patterns depending on whether the junction part forms included in each n-th order are the same as the junction part form with a (primary) separation structure or different from each other, and may have a junction part form with an alpha-alpha-type and a beta-alpha-type as in the left and right sides of FIG. 3, respectively.

The higher order hierarchical structure the extremely deformable structure has, the more various kinds the junction part form may have, and when the number of hierarchical structure and the type of junction part form are changed, an embedded form (an appearance in an active state) may be adjusted.

Further, according to an exemplary embodiment of the present disclosure, in the extremely deformable structure of the present disclosure, the (primary) displacement unit includes m basic displacement units, m separation parts are formed among the m basic displacement units, a junction part connecting the basic displacement units to each other is formed among the basic displacement units, the junction part has a (primary) junction part pattern in which an external junction part disposed at the outer portion of the basic displacement unit and an internal junction part which is not in contact with the outer portion of the basic unit cell are subsequently repeated, and the relative positions of the m basic displacement units are changed depending on the junction part pattern.

Further, according to another exemplary embodiment of the present disclosure, in the extremely deformable structure of the present disclosure, the (n-th) order displacement unit includes m (n–1th) order displacement units, m separation parts are formed among the m (n–1th) order displacement units, a junction part connecting the (n–1th) order displacement units to each other is formed among the (n–1th) order displacement units, the junction part has a (n-th) order junction part pattern in which an external junction part disposed at the outer portion of the (n–1th) order displacement unit and an internal junction part which is not in contact with the outer portion of the basic unit cell are subsequently repeated, and the relative positions of the m (n–1th) order displacement units are changed depending on the junction part pattern.

According to still another exemplary embodiment of the present disclosure, in the extremely deformable structure of the present disclosure, the junction part pattern of the displacement unit each has junction $part_1$ to junction $part_m$, each of the junction parts to junction $part_m$ has a junction part form selected from an external junction part and an internal junction part, and the junction parts adjacent to each other include an alpha-type junction part form which is different from junction part forms and a beta-type junction part form which has a junction part form opposite to the alpha-type junction form.

According to yet another exemplary embodiment of the present disclosure, the extremely deformable structure of the present disclosure is characterized that in the (primary) to (n-th) order displacement units, an alpha-type junction part pattern and a beta-type junction part pattern are subsequently alternately formed.

FIG. 4 illustrates the case where an extremely deformable structure having an embedded form according to an exemplary embodiment of the present disclosure has a quarternary hierarchical structure. The upper view and the lower view in FIG. 3 illustrate a case where all the primary to quarternary hierarchical structures have an alpha-type separation structure, and an example in which the primary to quarternary hierarchical structures subsequently alternately have a beta-type and an alpha-type.

FIG. 5 illustrates a process in which a material having a latent form according to an exemplary embodiment of the present disclosure is changed from the latent state to the active state by stretching, when having a quarternary hierarchical structure.

Referring to the process in which the extremely deformable structure illustrated in FIG. 4 is changed into the active state, it can be clearly seen that the case where each dimension in the primary to quarternary displacement units has an alpha-type junction part pattern (upper side) is different from the case where each dimension in the displacement units has a beta-alpha-beta-alpha-type junction part pattern in configuration and form in a finally activated state. That is, when the order of the hierarchical structure and the junction part pattern of each order are changed, it can be seen that the active state allows the extremely deformable structure to have different forms even though the structure has the same appearance.

The unit cells with the same order included in the extremely deformable structure have been described above by using an example in which the structure therein is the same as each other, but if necessary, even the unit cells with the same order may have different patterns, or some unit cells may not have a separation structure. However, the form in an active state may vary even though the appearance in a latent state is almost the same due to such a deformation.

FIG. 6 illustrates the case where an extremely deformable structure having an embedded form according to an exemplary embodiment of the present disclosure has a tertiary hierarchical structure. The upper drawing and lower drawing of FIG. 6 are an example in which the form and area of the case where a material with a tertiary hierarchical structure is in an active state are adjusted by adjusting the kind of separation structure with each order of a unit cell at the upper portion among primary unit cells and the other primary unit cells.

The examples illustrate an example (upper example) in which a tertiary unit cell in which all of a primary junction part pattern, a secondary junction part pattern, and a quarternary junction part pattern have an alpha-type junction part pattern and tertiary unit cells having a separation structure in which an alpha-type junction part pattern and a beta-type junction part pattern are each mixed and used in the secondary junction part pattern, or an example (lower example) in which a zero order unit cell which does not include an additional separation structure therein and tertiary unit cells in which an alpha-type junction part pattern and a beta-type junction part pattern are subsequently shown are present together. FIG. 7 is an example of an extremely deformable structure having an embedded form designed according to an exemplary embodiment of the present disclosure, and the three examples on the upper, middle, and lower portions are a view illustrating that the extremely deformable structure has a similar appearance in the latent state, but has different forms and areas in the active state according to what form the order of each hierarchical structure and the separation structure of each order have.

That is, it is possible to provide an extremely deformable structure having various forms and areas embedded (including an area between unit cells) according to the order of the extremely deformable structure, whether a displacement unit with an upper dimension is formed inside each unit cell, and the kind of junction part pattern formed inside the extremely deformable structure with each dimension. Furthermore, the form embedded in the extremely deformable structure as described above may be reversibly expressed, and it is possible to provide a structure having a form which is reversibly changed, such that the latent state is expressed by a predetermined stimulus, or the active state is conversely expressed by a predetermined stimulus.

Hereinafter, a method of manufacturing the extremely deformable structure will be described.

Various materials may be included alone or in mixture in the extremely deformable structure of the present disclosure. When a material having fracture resistance such as silicone rubber, which is not fractured even by a rotational momentum applied to a junction part, is applied as a material itself used in the extremely deformable structure is applied to, the entire extremely deformable structure may be made of the same material.

Meanwhile, when a rigid material having no fracture resistance is used, it is also possible to have a structure in which unit cells are connected to each other by applying a mechanical connecting means such as a hinge structure to a junction part.

According to another exemplary embodiment of the present disclosure, in the extremely deformable structure of the present disclosure, the unit cell and the junction part may include any one material selected from the group consisting of silicone rubber, a polyester resin, hydrogel, a transition metal, a carbon fiber, and any combination thereof.

According to still another exemplary embodiment of the present disclosure, in the extremely deformable structure of the present disclosure, a junction part of a basic displacement unit is composed of a structure which is capable of making a 3-dimensional rotational movement. Here, the junction part may be a hinge structure which is capable of making a 3-dimensional rotational movement.

The extremely deformable structure may be designed so as to have a specific hierarchical structure in advance, and then be made by a 3D-printer. On the contrary, the extremely deformable structure may also be molded by manufacturing a mold for an extremely deformable structure having a specific hierarchical structure in advance using a 3D-printer, and the like, and molding a polymer resin using the mold.

Further, the extremely deformable structure may also manufactured by assembling unit cells having specific size and configuration in advance with a junction part having a hinge structure and the like.

The extremely deformable structure made by the method may comprise reversible wrinkability, stretchable characteristics, flexible characteristics, or any combination thereof.

In addition, the present disclosure relates to a lithium secondary battery including a first unit; and an encapsulant which encapsulates the first unit. Here, the first unit includes a positive electrode including a positive electrode active material and a positive electrode current collector, a negative electrode active material, and a negative electrode current collector, and may include a negative electrode disposed so as to face the positive electrode, and a separation membrane provided between the positive electrode and the negative electrode.

The encapsulant is composed of the extremely deformable structure as described above, which includes a unit cell, a junction part which connects the unit cells adjacent to each other at the outer side and inside thereof, and a junction part pattern which connects the unit cell.

The encapsulant may be applied without particular limitation as long as the encapsulant is a material having elasticity. For example, silicone rubber, a polyester resin, hydrogel, a transition metal, a carbon fiber, and a material produced by combining these materials may be used as the encapsulant.

When the extremely deformable structure is applied to an encapsulant which serves as a template, it is possible to apply all of the lithium ion batteries in the form of a general pouch, in which the first unit is not specially manufactured while corresponding to the deformation because the unit cells are deformed while being rotated by the extremely deformable structure.

Furthermore, the present disclosure relates to a lithium secondary battery including a positive electrode active material, a negative electrode active material disposed so as to face the positive electrode active material, a separation membrane provided between the positive electrode active material and the negative electrode active material, and a positive electrode current collector and a negative electrode current collector provided at the outer side of each of the positive electrode active material and the negative electrode active material, in which the positive electrode active material and the negative electrode active material are composed of the extremely deformable structure as described above.

The positive electrode active material and the negative electrode active material may be applied without particular limitation as long as the materials are applied to have a predetermined thickness or less even though they do not have elasticity. For example, $LiCoO_2$, $LiNi_{0.8}Co_{0.15}Al_{0.05}O_2$, $LiMn_{1/3}Co_{1/3}Ni_{1/3}O_2$, and the like, which are excellent in reversible specific capacity, may be used as the positive electrode active material. Graphite may be used as the negative electrode active material.

When the extremely deformable structure is directly applied to the positive electrode and negative electrode active materials, it is possible to improve the fill factor of the active material, which contributes to the capacity within the volume of the entire device, and there is an effect in that the thickness of the entire device may be reduced compared to the case where the extremely deformable structure is applied to an encapsulant which serves as a template because the extremely deformable structure is hermetically sealed by one layer of the encapsulant.

Since the extremely deformable structure according to the present disclosure may be applied to the encapsulant which serves as a template and may be directly applied to the active material in constituting a lithium secondary battery as described above, the lithium secondary battery may be appropriately deformed and manufactured so as to be suitable for the customers' requirements. Further, when an extremely deformable structure is included, and the other constituent products, which constitute a battery except for a constituent product having the extremely deformable structure, may be assembled to a unit cell with an extremely deformable structure while being electrically connected to each other, the extremely deformable structure may also be applied to a constituent product other than the active material or the encapsulant.

When an extremely deformable structure is applied to the encapsulant or active material of the lithium secondary battery as described above, flexible characteristics, stretchable characteristics, and reversible wrinkability may be imparted to the lithium secondary battery. That is, it is possible to provide a lithium secondary battery which may be 2-dimensionally and 3-dimensionally deformed without limitation by characteristics of the extremely deformable structure.

In addition, flexible characteristics may also be imparted to the lithium secondary battery itself by adjusting the characteristics of a connecting part which connects unit cells of an encapsulant or active material to which the extremely deformable structure is applied. Furthermore, when the size of unit cells included in the extremely deformable structure, the order of the hierarchical structure, and the like are adjusted, it is possible to manufacture an electrode which may be closely adhered not only to a regular curved surface, but also to a curved surface having an irregular appearance without a lifting, and thus, the electrode may be usefully utilized in the field which requires a secondary battery which is closely adhered to the curved surface.

When an extremely deformable structure is applied to an encapsulant or active material of a lithium secondary battery, strain in the case where the lithium secondary battery is extremely crumpled is applied only to junction parts which connect each of the unit cells of the extremely deformable structure, strain applied to each of the junction parts may be not strain due to wrinkling, but strain due to simple bending, and accordingly, the strain may be considerably less applied to the case where the extremely deformable structure is applied than the strain due to wrinkling in the case where the extremely deformable structure is not applied.

Further, when the secondary battery is reversibly wrinkable, the battery may be advantageous in transportation because it is possible to remove a spatial disadvantage produced when a wide substrate is used, and it is possible to transport the battery in the form of a sphere in a crumpled state, and the like. In addition, resistance to a sudden external force, such as being broken, fractured, or bent may be strengthened.

Meanwhile, the electrical connection between unit cells of an extremely deformable structure constituting a lithium secondary battery may be connected in series or in parallel by using electrical wires, and the like. The battery capacity and working voltage of a lithium secondary battery may be controlled by adjusting the combination of series or parallel connection.

For example, when the specification of a first unit battery inserted in a unit cell encapsulant has 3.7 V and 5 mAh, and a total of 16 unit cells are stacked as only a layer, the battery capacity which may be set is 80 mAh at 3.7 V. However, when high voltage is needed in some cases, it is possible to increase the voltage by forming a second unit composed of a set of first unit cells through a parallel connection, and then connecting each second unit in parallel, and the working voltage and the capacity interval, which may be set by connecting the 16 unit cells, are 3.7 V and 80 mAh to 59.2 V and 5 mAh. Furthermore, when the first unit in one unit cell encapsulant is stacked in various layers, it is possible to expand the capacity without limitation in proportion to the number of stacked layers.

Accordingly, the lithium secondary battery including an encapsulant or active material having the extremely deformable structure may have a voltage capacity and a working voltage, which may be set without limitation, and the design thereof may also be differently set, if necessary. Further, as the conventional electrode application method has been recently used as it is in a manner different from other studies on a flexible lithium secondary battery, an excellent reversible capacity may be easily secured, thereby achieving commercialization.

According to the present disclosure, it is possible to provide a structure whose appearance and configuration such as ductility, flexibility, stretchability, and wrinkable properties may be 2-dimensionally and 3-dimensionally deformed without limitation by an external stimulus.

In addition, by applying the extremely deformable structure according to the present disclosure to a lithium secondary battery, the battery voltage or the working voltage, and the like may be controlled, and it is possible to control elastic strain which is an important parameter in regard to fracture resistance, miniaturization, portable convenience and the like, and thus, the extremely deformable structure according to the present disclosure may be provided as a power device in a military material, a wearable material, a flexible product, and the like.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated. Hereinafter, the present disclosure will be described in more detail with reference to the accompanying drawings in regard to the exemplary embodiments of the present disclosure.

Example 1: Manufacture of Extremely Deformable Structure Having Quarternary Hierarchical Structure An extremely deformable structure having a quarternary hierarchical structure was manufactured by using a 3D printing method. As a 3D printer, Objet260 Connex™ from Stratasys Design Line was used, and an extremely deformable structure, in which the (primary) to (quarternary) displacement units had alpha-type, beta-type, alpha-type, and beta-type junction part patterns, respectively, was manufactured.

Figure 8:
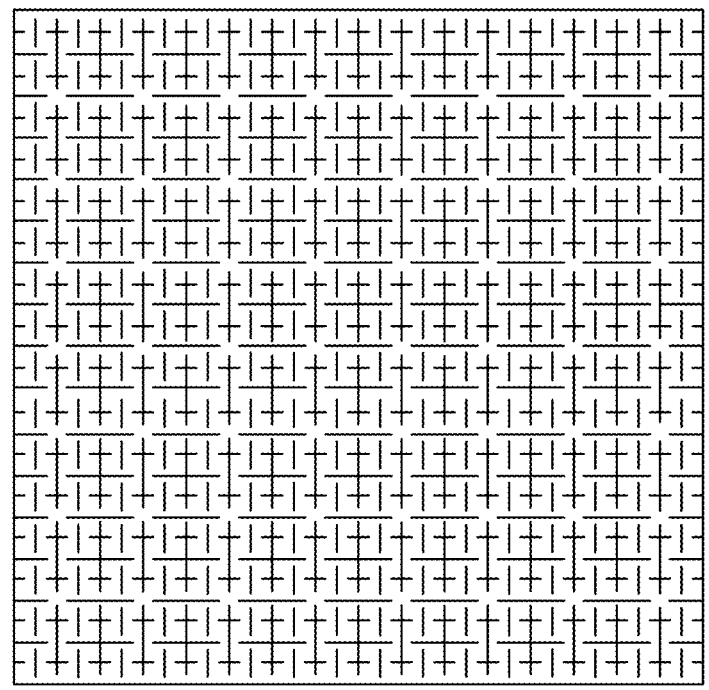
FIG. 8 is an example in which a material having a tertiary hierarchical structure manufactured by using a 3D-printer in Example 1 is manufactured, and a junction part pattern of the material is an actual photograph in a latent state of a sample in which the primary to tertiary junction part patterns are all formed of an alpha-type junction part pattern.

FIG. 8 is an example of a material having an extremely deformable structure with a quarternary hierarchical structure manufactured by using a 3D printer in Example 1. FIG. 8 is an actual photograph of a sample in a latent state, in which the primary to quarternary junction part patterns in the junction part pattern made of the material were manufactured by subsequently forming alpha-type and beta-type junction part patterns, and FIG. 9 is a photograph taken by setting the extremely deformable structure to the active state.

Figure 9:
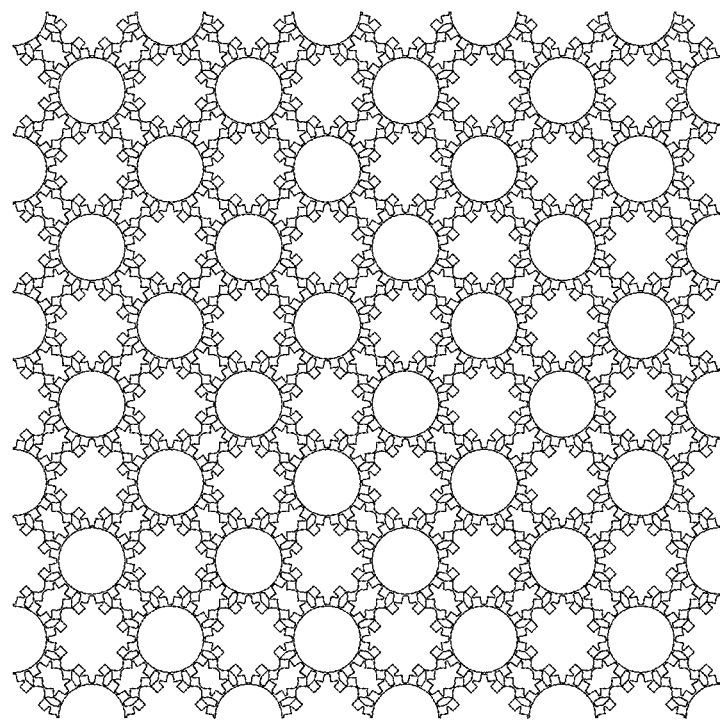
FIG. 9 is a photograph taken while the extremely deformable structure of FIG. 8 is set to an active state.

Referring to FIGS. 8 and 9, it could be confirmed that each of the unit cells was rotated and relatively moved by external force, and thus, was deformed into the form of FIG. 9, which had been latent.

Example 2: Manufacture of Electrode Having Extremely Deformable Structure

A mold capable of manufacture an extremely deformable structure was manufactured by using the same 3D printer as that used in Example 1, and an extremely deformable structure made of silicone rubber was molded by using the mold.

An electroconductive coating layer was formed on a surface of the extremely deformable structure in the present Example by using the following process.

Step 1: A carbon nanotube gel was prepared by the following method by mixing carbon nantotubes (a product manufactured by Hanwha Nanotech Corporation) with an imidazoliu-based ionic liquid.

20 mg of single-wailed carbon nanotubes were put into a mortar and pestle, and 20 mg or 60 mg of 1-butyl-3-methylimidazolium bis(trifluoromethylsulfonyl)imide was put into the mortar and pestle. Thereafter, a material in the form of gel was obtained by sufficiently stirring the mixture using a pestle for about 10 minutes.

Step 2: The carbon nanotube gel prepared was put into a vial containing 20 ml of toluene, and an ultrasonic treatment was performed by using a bath-type sonicator for 1 hour.

Step 3: A commercially available silicone rubber KE-441 manufactured by Shinetsu Chemical Co. was dissolved in a carbon nanotube solution prepared in Step 2. At this time, the silicone rubber was put thereinto, such that the content of silicone rubber became a desired content ratio of the carbon nanotubes. That is, 480 mg of KE-441 was put thereinto in order to obtain a composite including 4 wt % of carbon nanotubes. Next, the mixture was stirred at a speed of 1,500 rpm for about 6 hours. A mixture solution of carbon nanotubes/polymer was coated on a substrate by using an air spray. For the coating method, a substrate composed of an extremely deformable structure was sufficiently pre-heated on a hot plate at 50° C. for 30 minutes, and then the mixture solution with a predetermined content was spray-coated thereon. The coated film was dried on the hot plate at 50° C. for about 1 hour, and then further dried in a vacuum oven overnight.

Step 4: In order to dope the film manufactured with acid, a Petri dish containing 5 ml of nitric acid was placed on a hot plate preheated to 70° C., and the upper portion was covered by using a very wide beaker. After about 10 minutes, a film coated with a composite electrode was placed in the beaker by using a pair of laboratory pincers, and the beaker was again covered to allow the film to be exposed to a nitric acid vapor for about 30 minutes. After the acid vapor doping was completed, the film was dried in a vacuum oven overnight.

Figure 10:
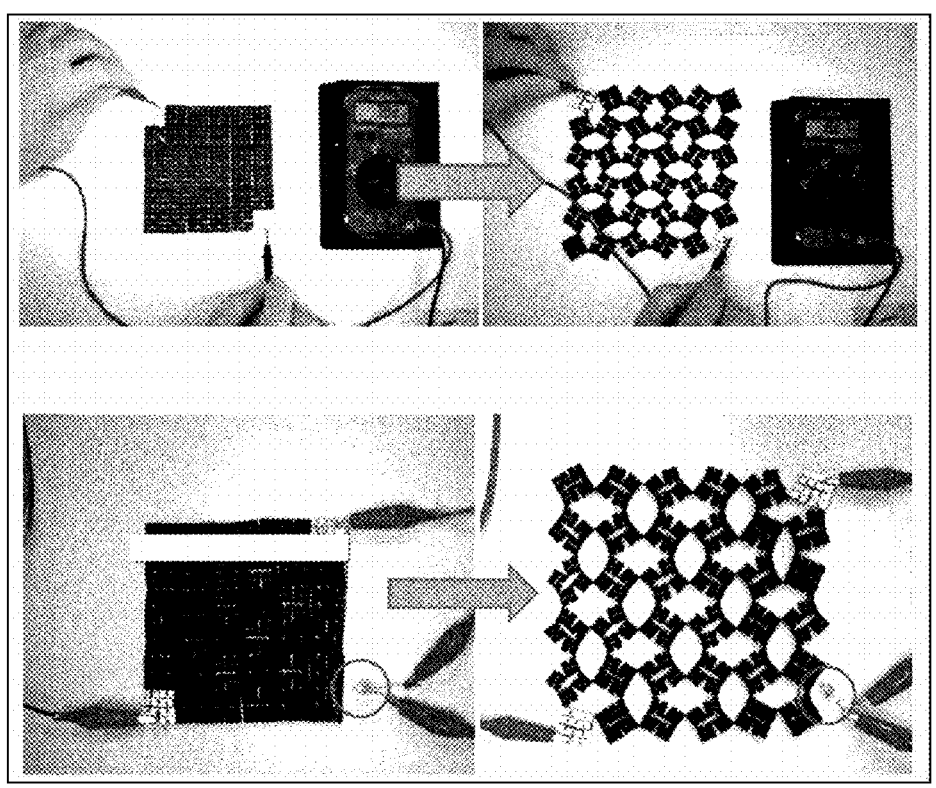
FIG. 10 is photographs illustrating the conductivity of flexible and stretchable electrodes manufactured by applying a current collector having the conductivity of an extremely deformable structure according to an exemplary embodiment of the present disclosure.

The electroconductivities of the shape conversion electrode thus manufactured in Example 2 in the latent state and the active state were compared to each other, and the results are shown in FIG. 10. Referring to FIG. 10, it can be confirmed that the electroconductivities in both the latent state and the active state were maintained.

Figure 11:
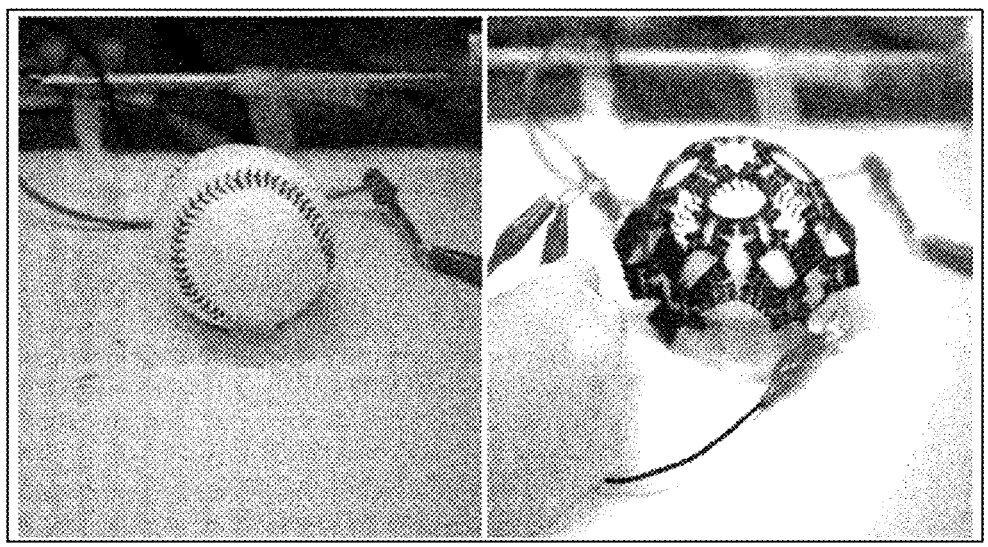
FIG. 11 is a photograph illustrating the conductivity of flexible and stretchable electrodes manufactured according to FIG. 10 when the electrodes are placed on a spherical baseball.

Further, it was experimented whether the electrode in Example 2 maintained the electroconductivity even in a curved surface, and the results are shown in FIG. 11. Referring to FIG. 11, when a commercially available baseball was fixed and the shape conversion electrode was placed on one surface of the spherical curved surface, it can be confirmed that the shape conversion electrode created a space between appropriate unit cells, which could be closely adhered to the spherical curved surface, and thus, had an active state in the form of being closely adhered to the spherical curved surface. Further, as a result of performing an electroconductivity test by using an electric bulb while the electrode was closely adhered to the baseball, it can be confirmed that the bulb was lit in brightness similar to that in FIG. 10, and that the shape conversion electrode maintained the electroconductivity even in an active state where the electrode was closely adhered to the curved surface.

Figure 12A:
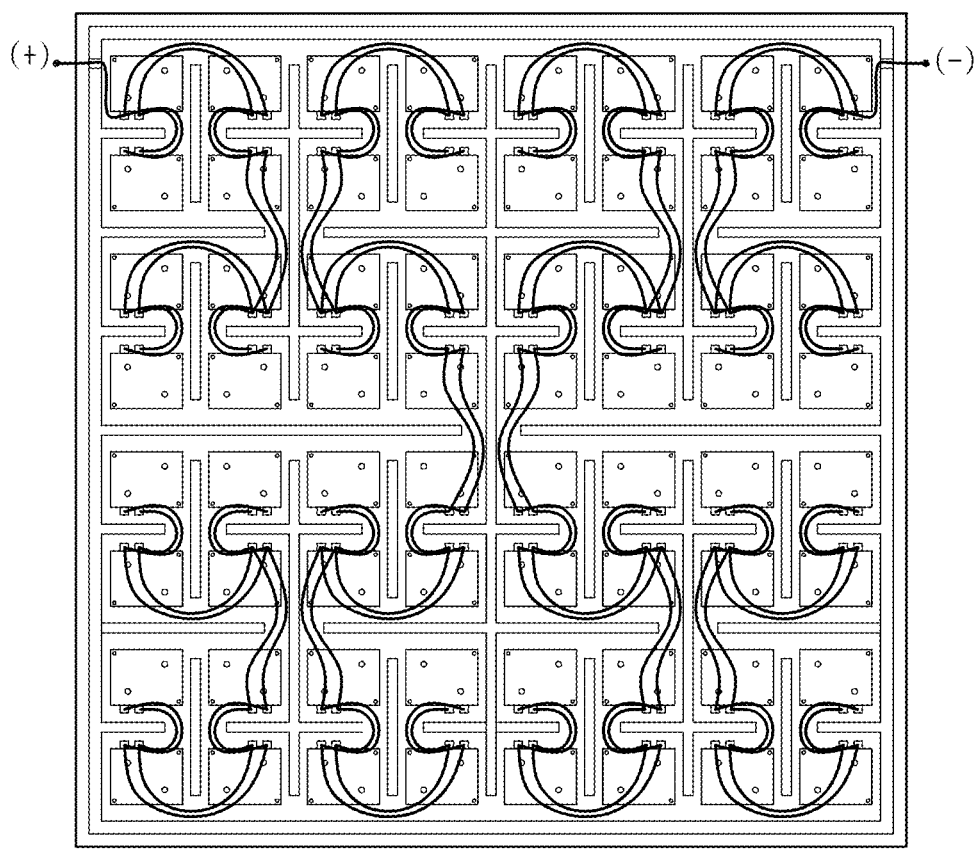
FIG. 12A is a circuit diagram for implementing a lithium secondary battery in the form of an extremely deformable structure.
Figure 12B:
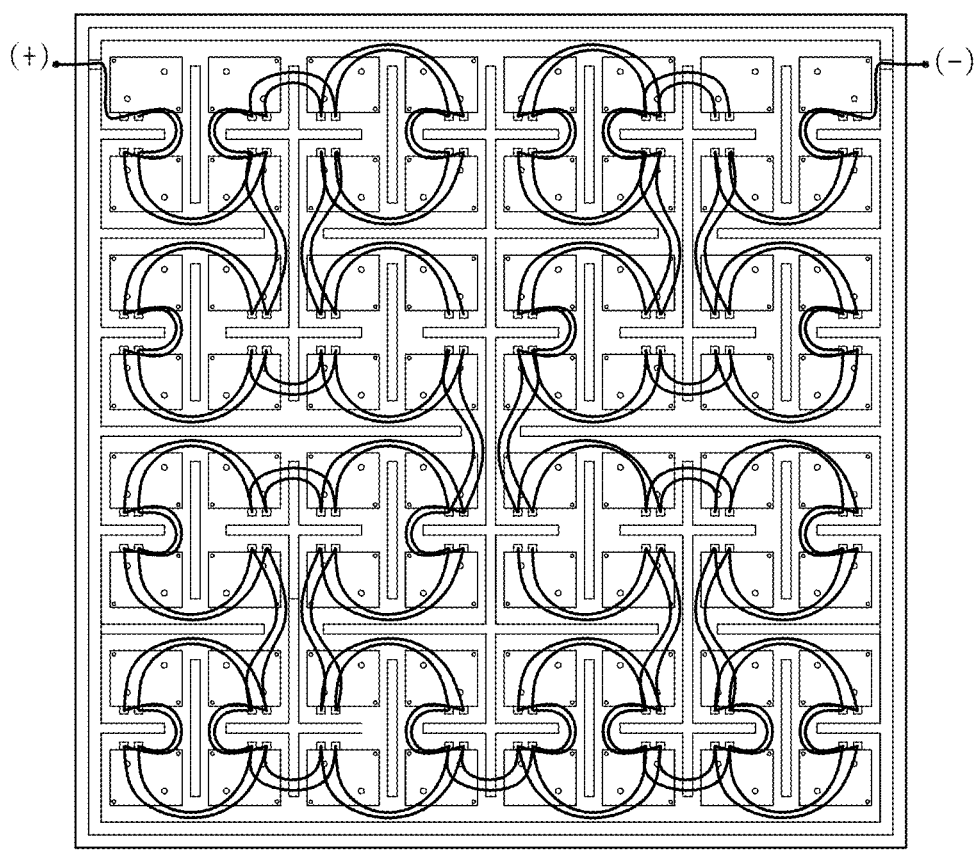
FIG. 12B is a circuit diagram of 64 pouch-type lithium secondary batteries which are actually connected in series and in parallel by using copper wires plated with nickel and chromium in a similar manner to the circuit diagram.

Example 3: Manufacture of Lithium Secondary Battery Including Encapsulant for Extremely Deformable Structure Having Tertiary Hierarchical Structure A lithium secondary battery including an encapsulant for an extremely deformable structure having a tertiary hierarchical structure was manufactured. In order to emphasize the availability of a pouch-type lithium secondary battery manufactured by a traditional method, 64 pouch-type unit cells were connected to each other by soldering using a covered wire made of a bundle of copper wires plated with nickel and chromium, which is resistant to bending so as to be suitable for the circuit diagram illustrated in FIG. 12 A (see FIG. 12B).

A positive electrode aluminum which is an external terminal of each pouch-type cell, an aluminum flux in order to facilitate the junction between the negative electrode nickel and the copper wires, and a copper flex were used as additives during the soldering. One unit cell used the positive electrode active material $LiNi_{0.8}Co_{0.15}Al_{0.05}O_2$-negative electrode active material artificial graphite, and a gel-type $LiPF_6$-based material was applied as an electrolyte. At this time, the unit cell has a theoretical capacity of 6.7 mAh and an actual nominal expected capacity of 5 mAh until 300 cycles. When series and parallel connection methods are deformed at the time of connecting unit cells, the voltage and the storage capacity may be changed so as to be suitable for the application to be applied, and in the present disclosure, a device having a specification of a working voltage of 14.8 V-80 mAh, 7.4 V-160 mAh, and 3.7 V-80 mAh was manufactured. In particular, in the case of 3.7 V-80 mAh, it can be confirmed that the device was manufactured by a method of stacking four cells in one displacement unit in an extremely deformable structure, and thus, the capacity may be increased by manufacturing the device so as to have 16 cells in the four displacement units. The design capacity and working voltage may be controlled through deformation of series or parallel connection of the hierarchical structure for each order, and is not limited to the capacity and working voltage as described above. The device specification corresponding to FIGS. 12 to 15 expressed as Examples was 7.4 V-160 mAh.

RTV-3481, a product manufactured by Dow Corning Corporation, which is a kind of silicone rubber that is one of materials excellent in strength and elastic strain, was used as an encapsulant material so as to be capable of effecting elastic deformation. The mixing ratio of a base material and a curing agent used was 20:1. In order to package the 64 cells connected by electric wires, a mold for making an extremely deformable structure having a tertiary hierarchical structure was manufactured by using a 3D printing method. As a 3D printer, Projet 160 manufactured by 3D Systems Inc. was used, and a pattern, in which all of the tertiary displacement units had an alpha-type junction part pattern, was implemented.

Figure 13A:
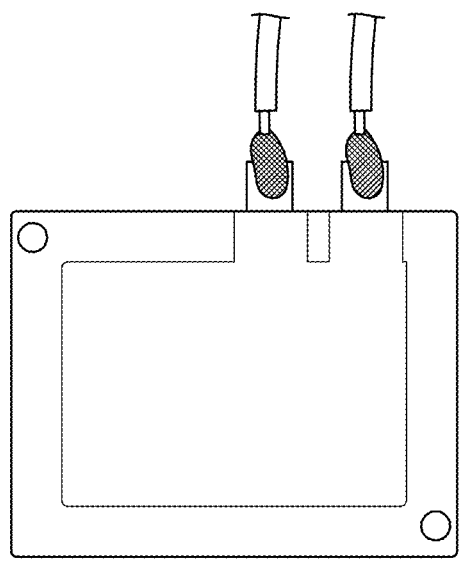
FIG. 13A to 13F are aerial view circuit diagrams illustrating a process of manufacturing a lithium secondary battery having an extremely deformable structure.
Figure 13B:
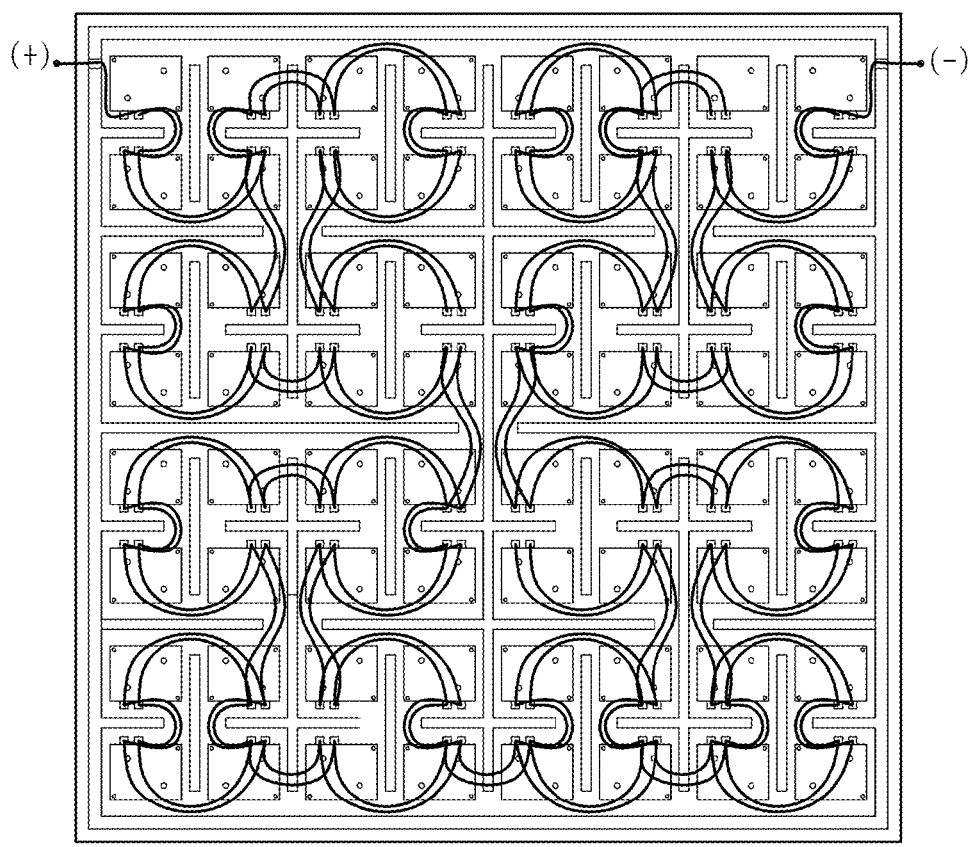
Figure 13C:
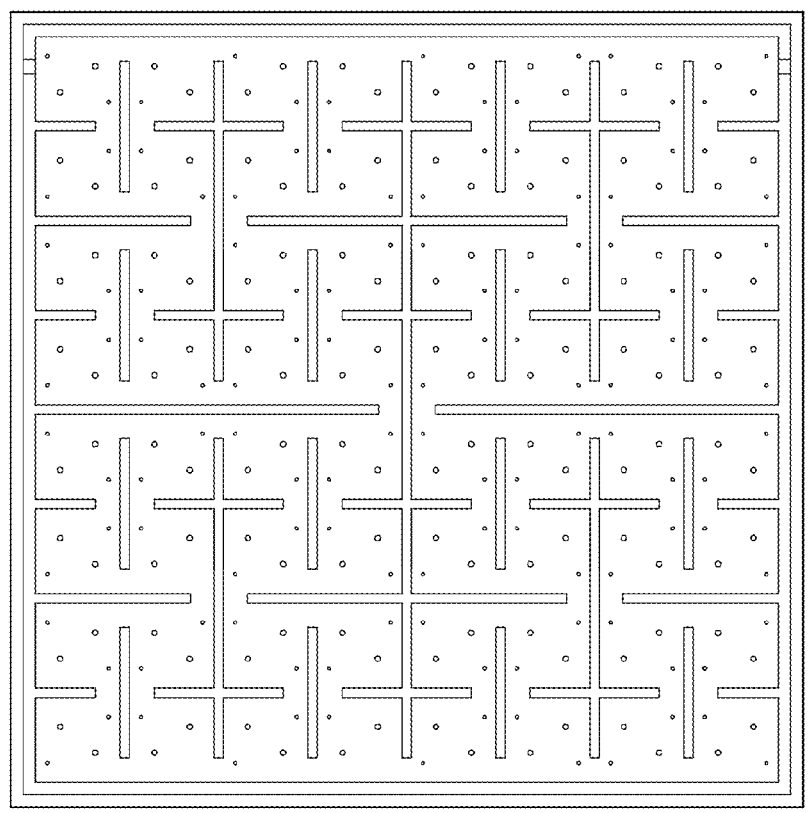

Two 2-mm holes were perforated on each cell sealing portion such that the 64 cells connected by electric wires could be inserted into an expected position in the encapsulant, and thus, a method of fixing the cells to pins in the mold manufactured by the 3D printer was used (see FIG. 13A). Since there are, in the mold, two long pins which passes through the cell and two pins with half a height such that the cell could be disposed in a thickness direction in an encapsulant to be completely manufactured, 64 cells were designed, such that the x, y, and z coordinates could be fixed in one displacement body (see FIG. 13C).

Figure 13D:
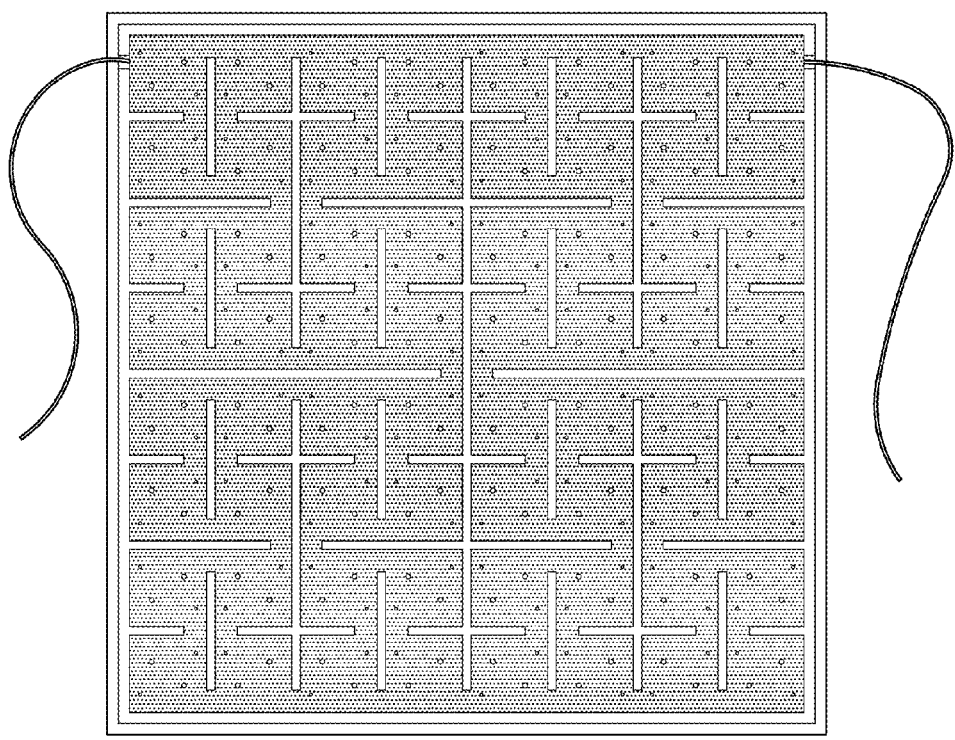
Figure 13E:
Figure 13F:
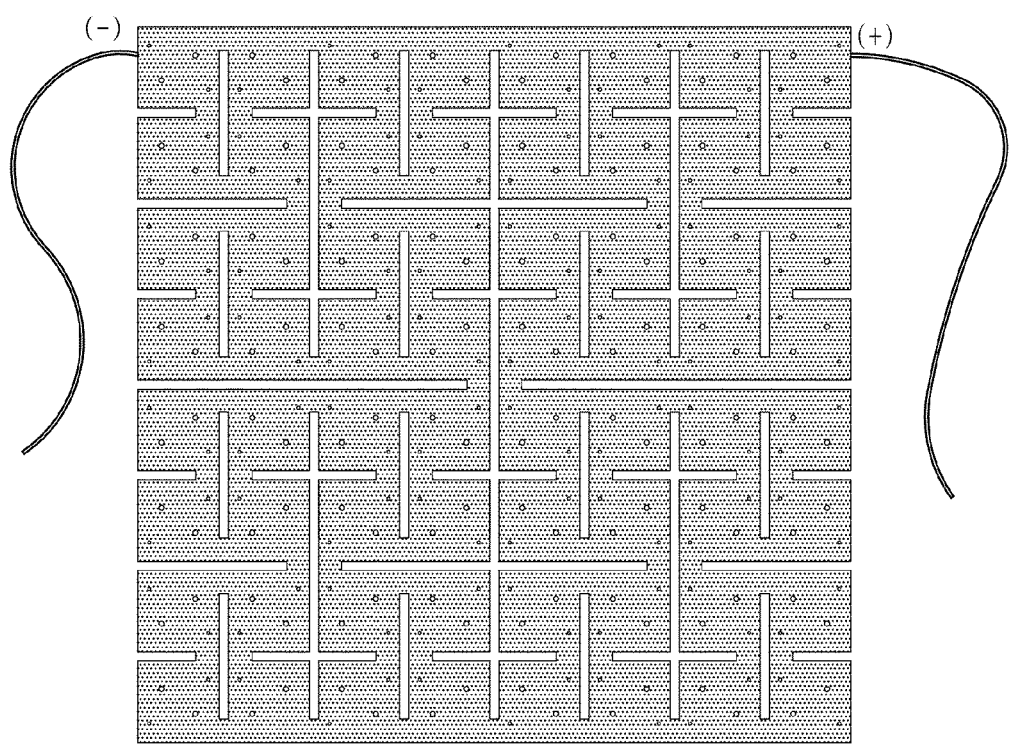

The 64 cells connected by electric wires were fixed at an expected position in the mold, a liquid silicone rubber before being solidified was poured into a mold as in FIG. 13D and then the device was removed from the mold as in FIG. 13E, thereby completing a lithium ion battery having a final extremely deformable structure as in FIG. 13F

Figure 14A:
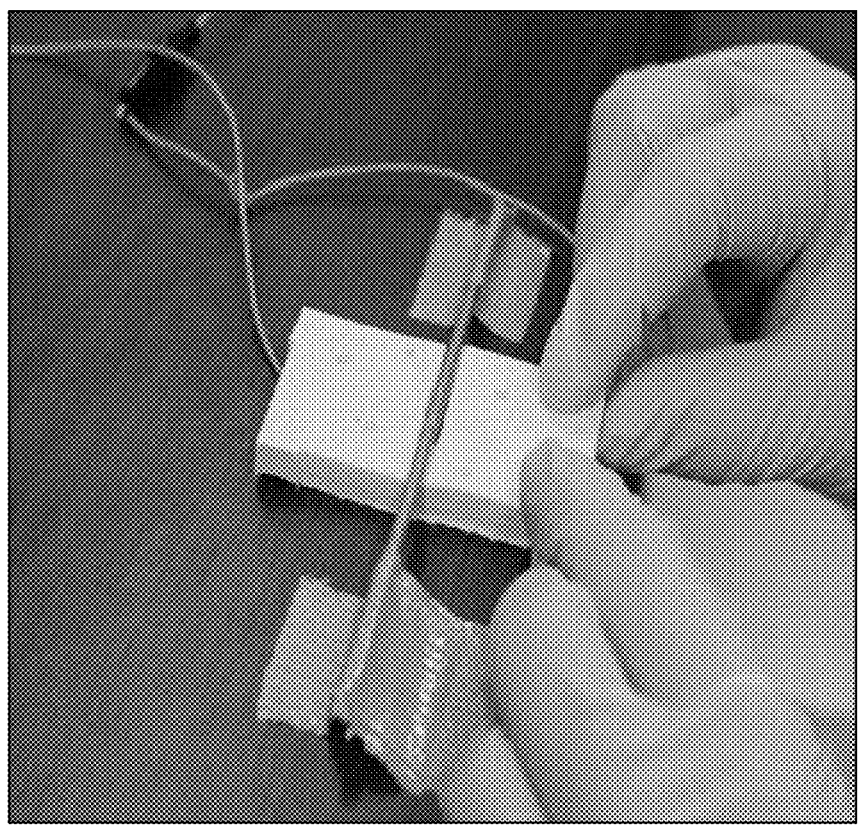
FIG. 14A is photograph before a bending test.
Figure 14B:
FIG. 14B is photograph after a bending test.
Figure 14C:
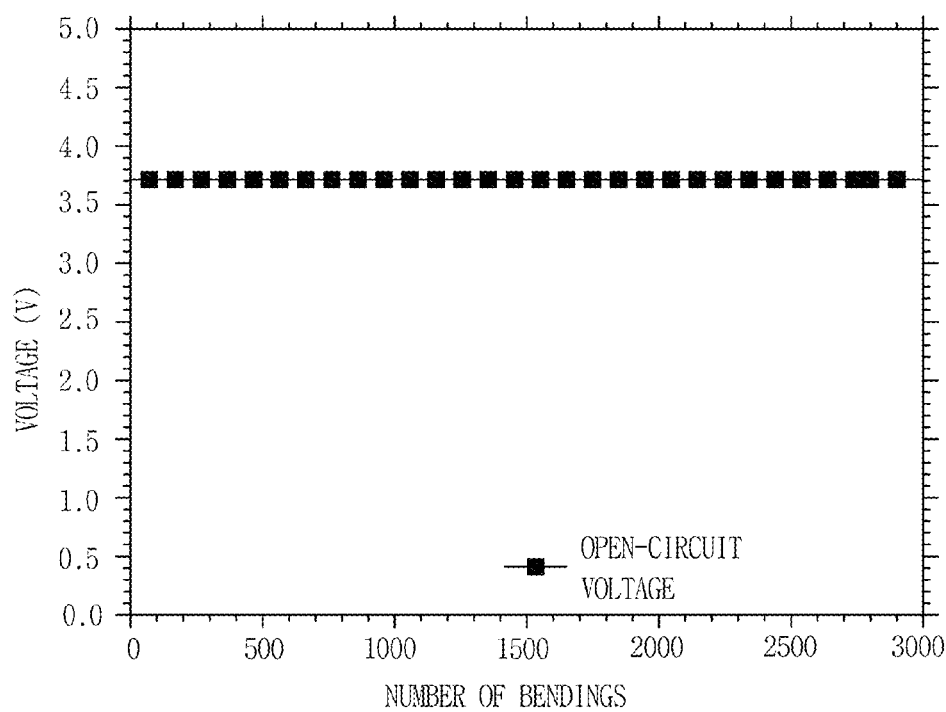
FIG. 14C a graph illustrating the change trend of the open-circuit voltage during the bending test performed 3,000 times.
Figure 15A:
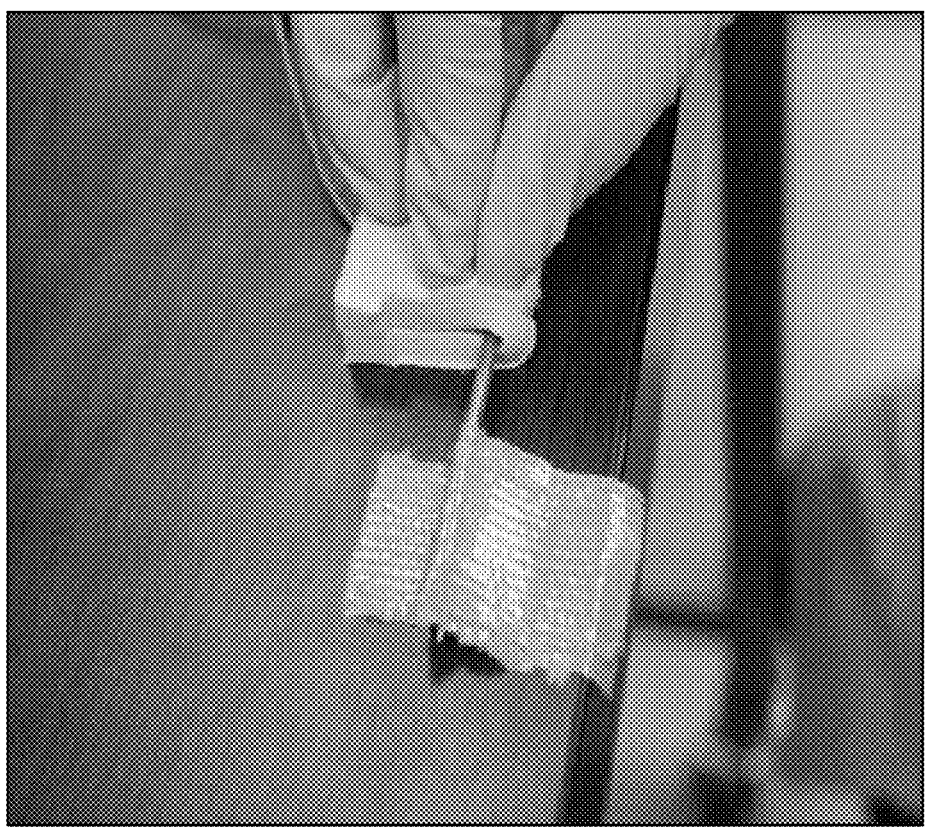
FIG. 15A is photograph before a stretching test in which a stainless steel tube having a diameter of $\frac{1}{8}$ inches was adopted as an axis and one cell was rotated while the junction part was brought to face each other.
Figure 15B:
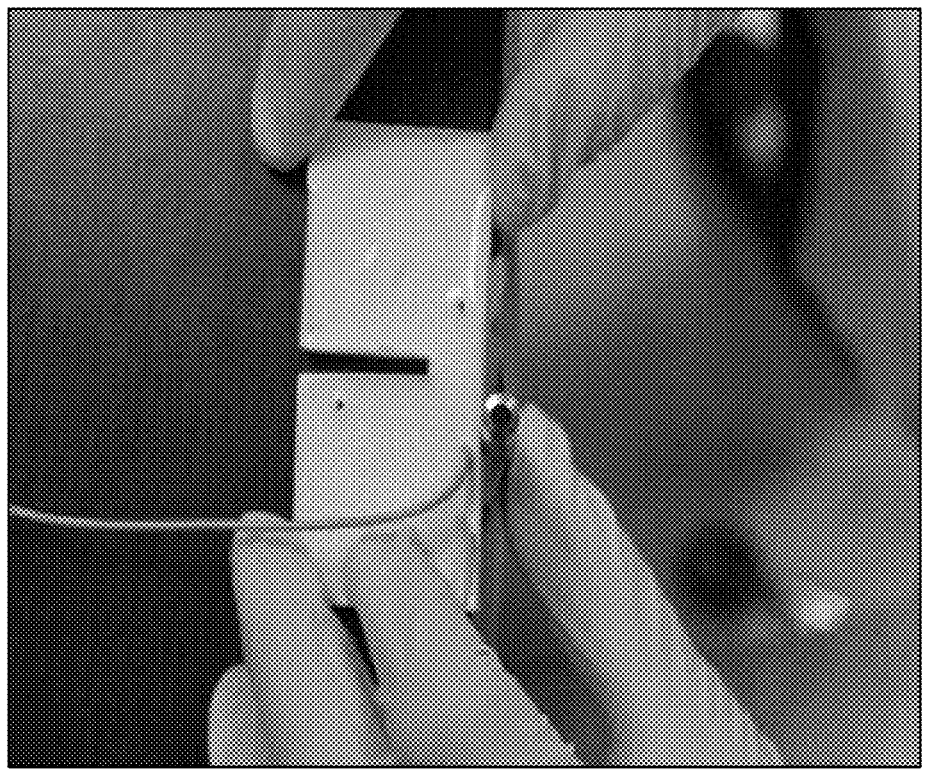
FIG. 15B is photograph after a stretching test in which a stainless steel tube having a diameter of $\frac{1}{8}$ inches was adopted as an axis and one cell was rotated while the junction part was brought to face each other.
Figure 15C:
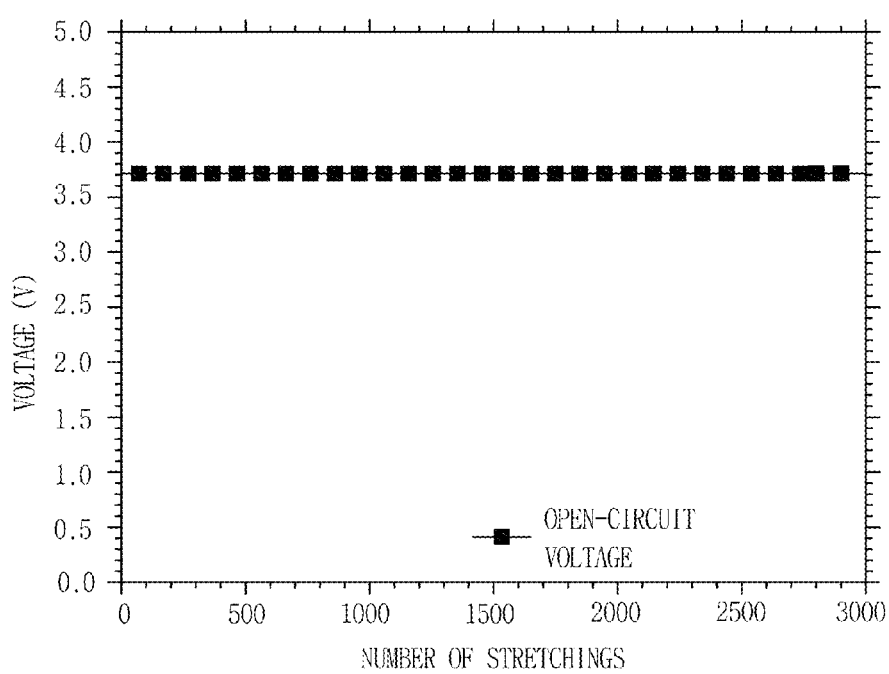
FIG. 15C is a graph illustrating a change in open-circuit voltage during the stretching test performed 3,000 times.
Figure 16A:
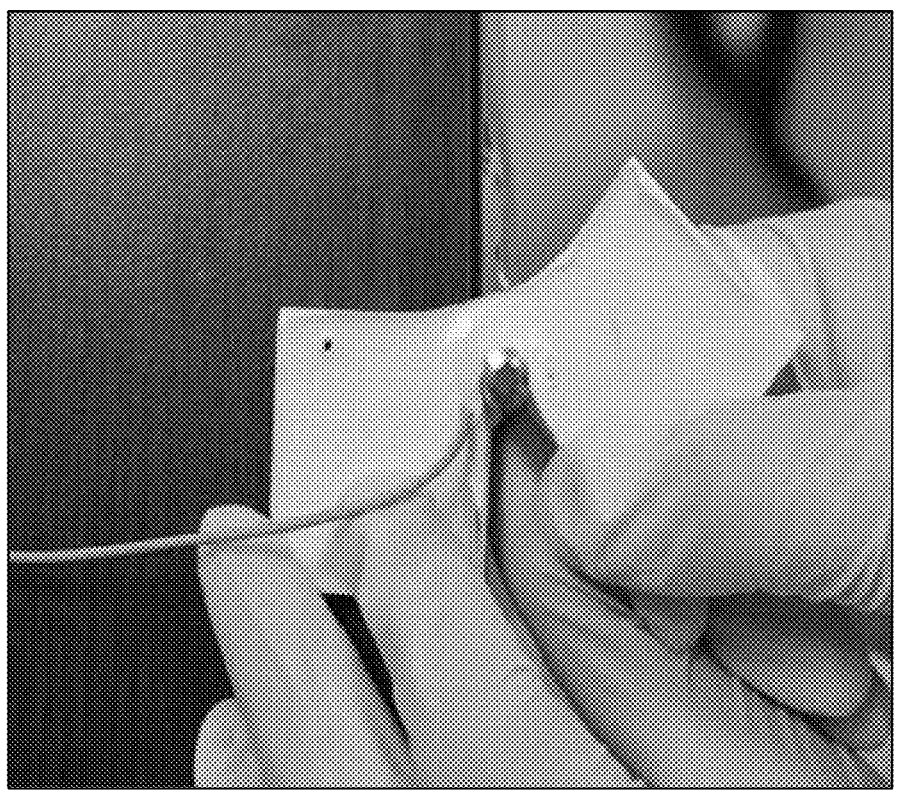
FIG. 16A is photograph before the test in which a stainless steel tube having a diameter of $\frac{1}{8}$ inches was adopted as an axis and one displacement body was rotated at 180 degrees based on the axis while the junction part was brought to face each other, that is, warping is totally formed.
Figure 16B:
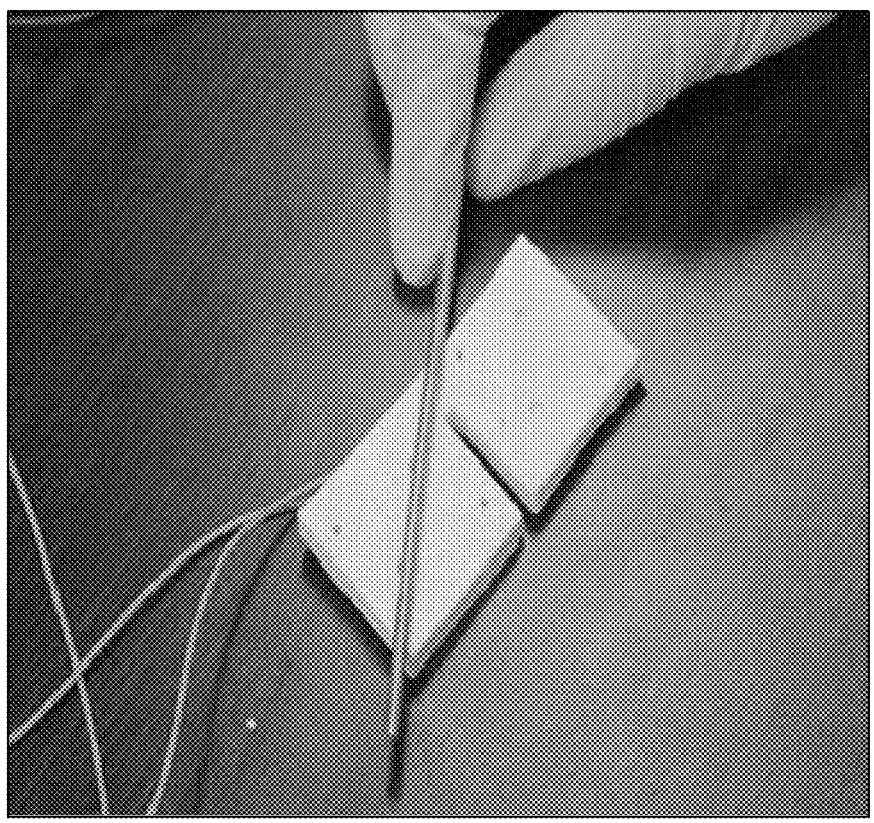
FIG. 16B is photograph after the test in which a stainless steel tube having a diameter of $\frac{1}{8}$ inches was adopted as an axis and one displacement body was rotated at 180 degrees based on the axis while the junction part was brought to face each other, that is, warping is totally formed.
Figure 16C:
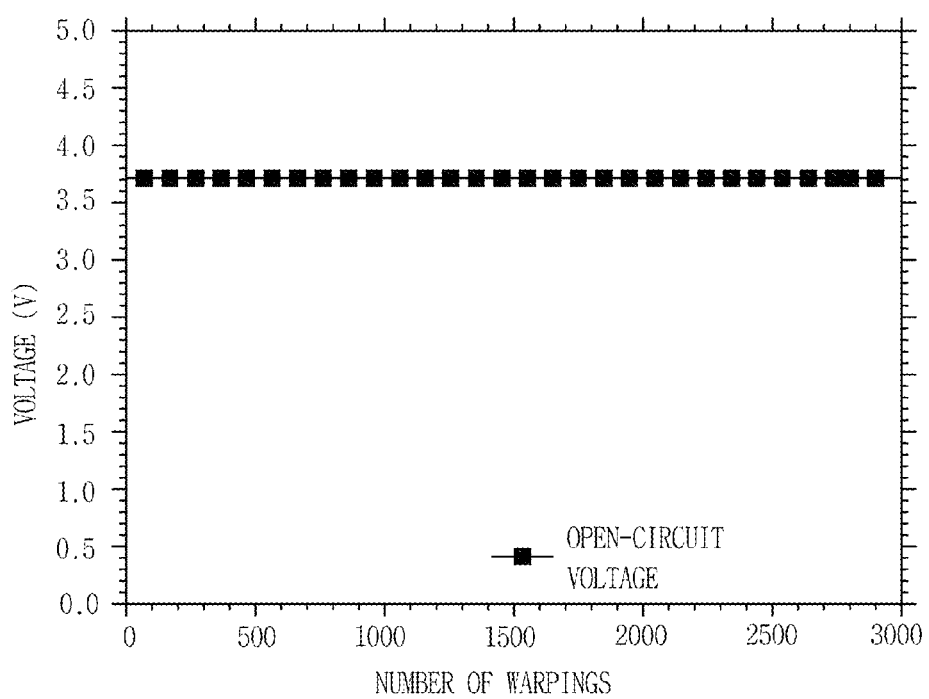
FIG. 16C is a graph illustrating an open-circuit voltage during the warping test performed 3,000 times.

In order to confirm the electrochemical stability of the lithium ion battery having an extremely deformable structure for an external mechanical stress, a mechanical characteristic test was performed as in FIGS. 14 to 16 by designating two unit displacement bodies and a junction part (hinge) connecting the displacement bodies.

In the case of the extremely deformable structure according to the present disclosure, more deformation is applied to the junction part connecting the unit displacement bodies than to the unit displacement bodies, and thus, bending (FIG. 14), stretching (FIG. 15), and warping (FIG. 16) tests were performed 3,000 times at a speed of 1 Hz in order to test the stability of the junction part, and the change in open-circuit voltage is shown as a graph.

Figure 1:
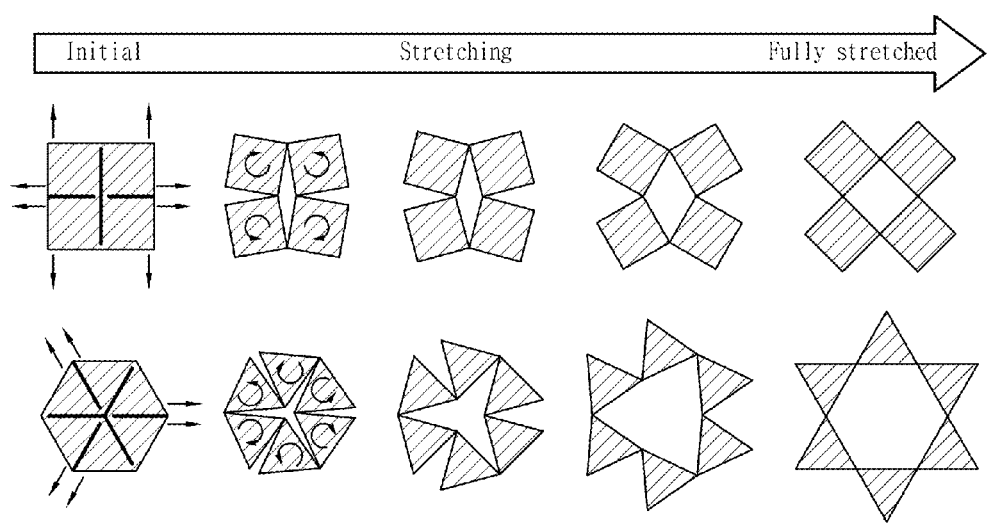
FIG. 1 is a schematic view describing a process in which a basic displacement unit of an extremely deformable structure according to an exemplary embodiment of the present disclosure is changed from the latent state to the active state.
Figure 2:
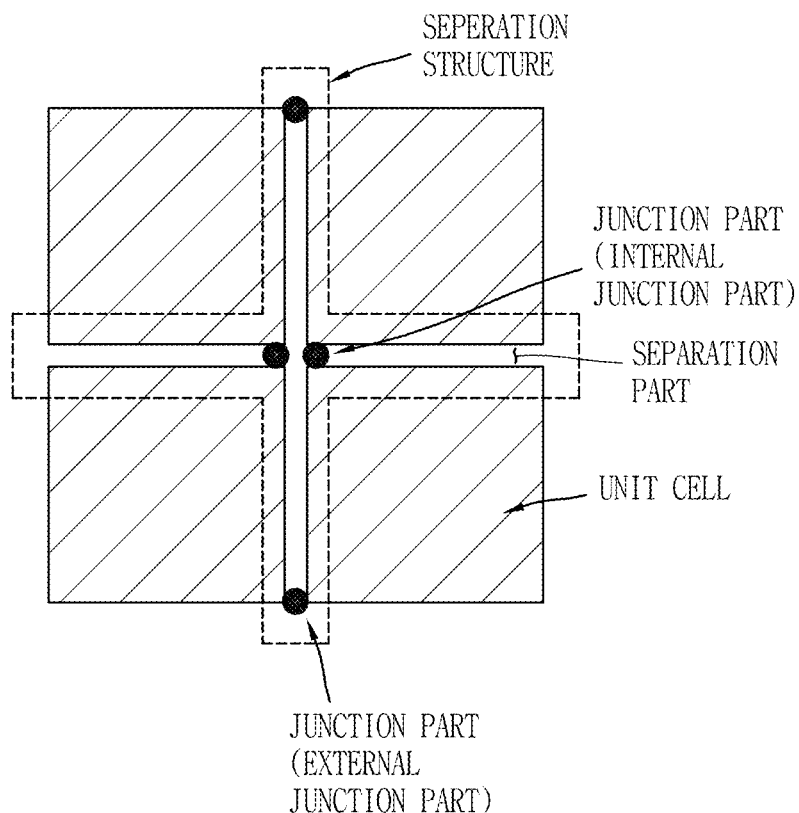
FIG. 2 is a conceptual view describing the name of each part by using, as an example, the case where a basic displacement unit included in the extremely deformable structure according to an exemplary embodiment of the present disclosure has a tetragonal appearance and m=4.
Figure 3:
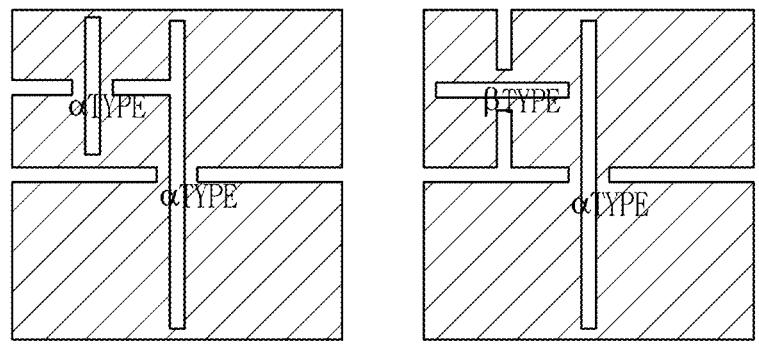
FIG. 3 is a conceptual view for describing a junction part pattern of an extremely deformable structure having a secondary hierarchical structure, which is an extremely deformable structure (left side) in which the (primary) junction part of an extremely deformable structure having an embedded form according to an exemplary embodiment of the present disclosure is an alpha-type and the (secondary) junction part pattern corresponding to the unit cell on the left side upper portion in the first unit cells and formed in the (secondary) displacement unit which serves as the (secondary) displacement unit is an alpha-type; and an extremely deformable structure (right side), which is the same as the example on the left side, but has a beta-type (secondary) junction part pattern.
Figure 4:
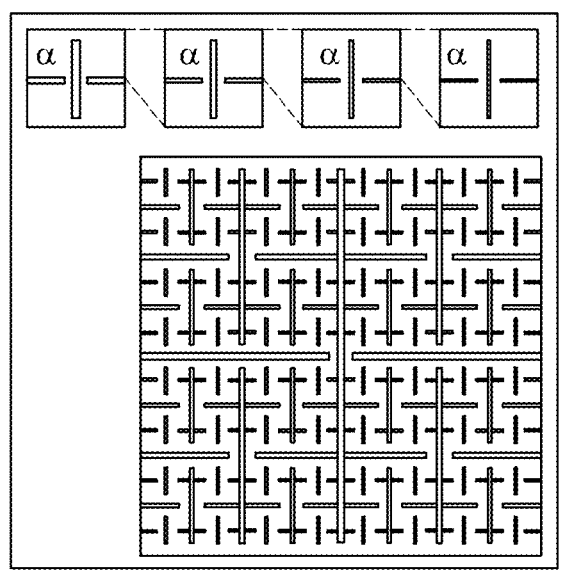
FIG. 4 illustrates the case where an extremely deformable structure having an embedded form according to an exemplary embodiment of the present disclosure has a quarternary hierarchical structure, the upper example is a case where all of the primary to quarternary hierarchical structures have an alpha-type junction part pattern, and the lower example is an example showing that the primary to quarternary hierarchical structures have subsequently alternately beta-type and alpha-type.
Figure 4:
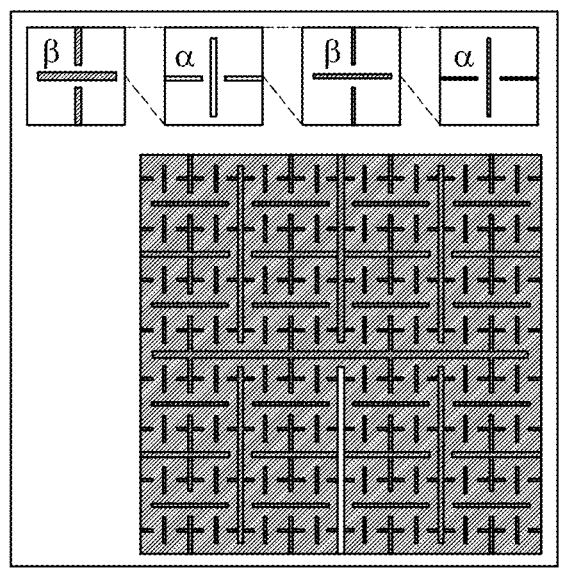
Figure 5:
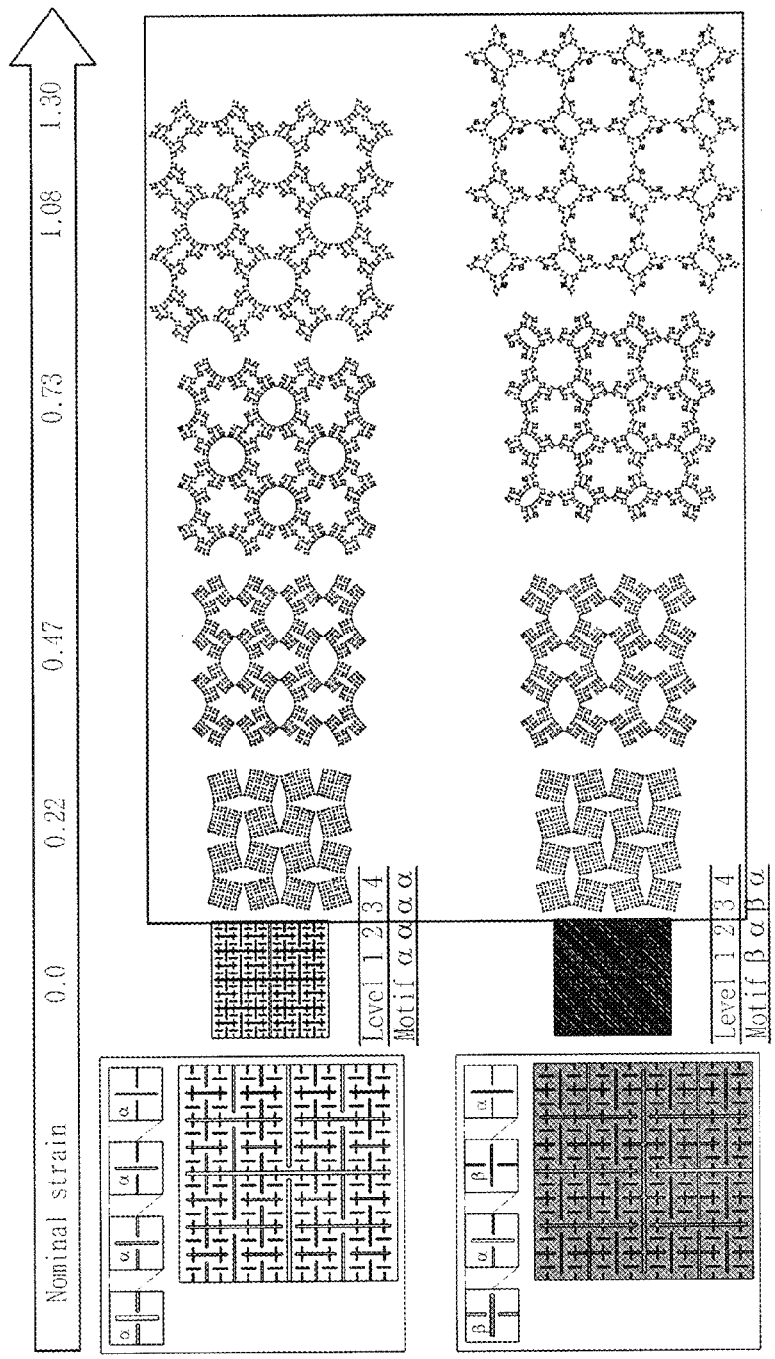
FIG. 5 illustrates the case where an extremely deformable structure having an embedded form according to an exemplary embodiment of the present disclosure has a quarternary hierarchical structure, and is a view illustrating that the upper example is a material where all of the primary to quarternary hierarchical structures have an alpha-type junction part pattern, the lower example is a material where the alpha-type junction part pattern and the beta-type junction part pattern are repeatedly formed in the primary to quarternary hierarchical structures, and each of the materials is deformed into the active state in a stepwise manner.
Figure 6:
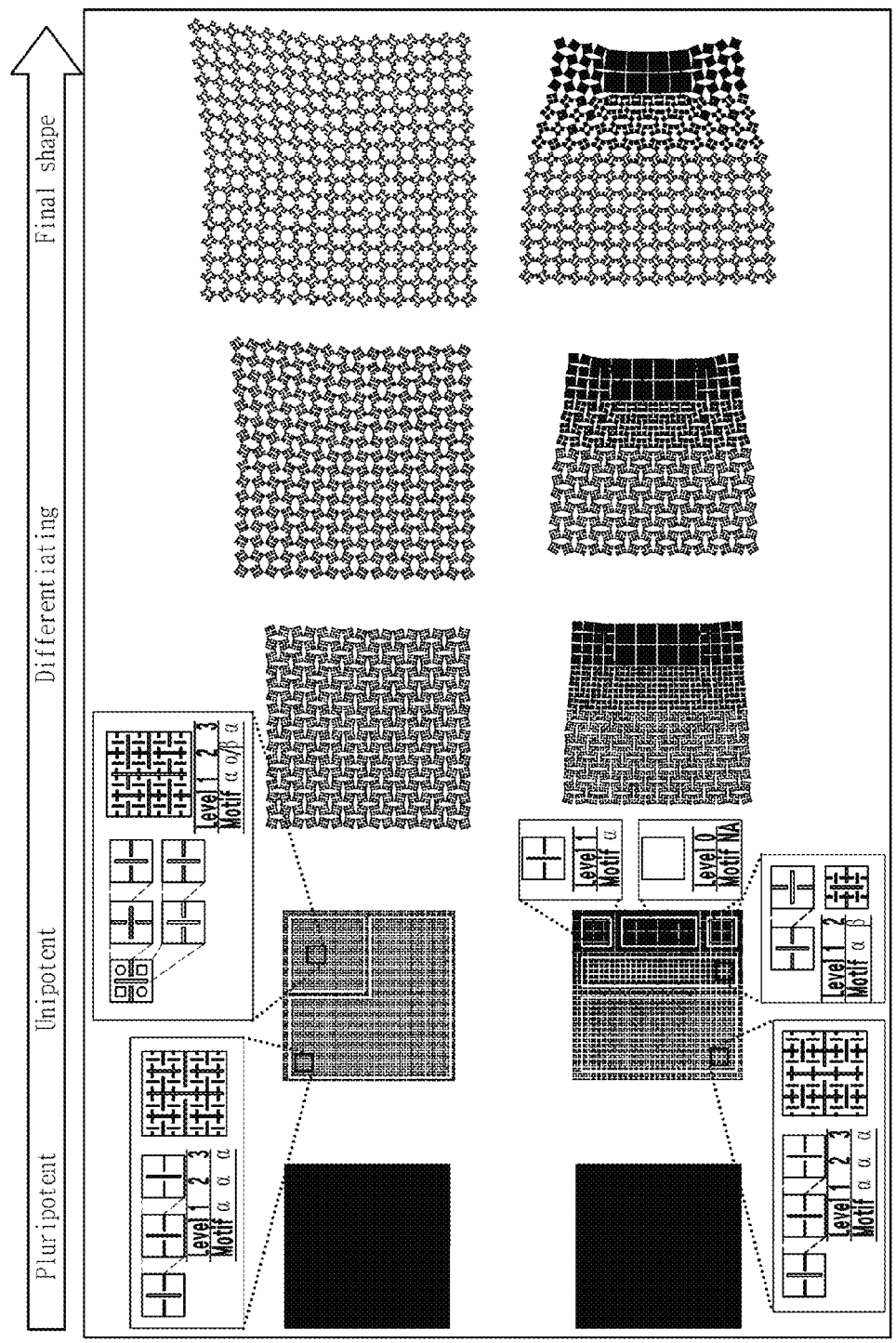
FIG. 6 illustrates the case where an extremely deformable structure having an embedded form according to an exemplary embodiment of the present disclosure has an octanary hierarchical structure, and the upper and lower examples are an example in which the form and area of the case where a material with an octanary hierarchical structure is in an active state are adjusted by adjusting the kind of junction part pattern with each order of the unit cell on the upper right portion among primary unit cells and the other primary unit cells. The examples illustrate an example (upper example) in which a tertiary unit cell in which all of a primary junction part pattern, a secondary junction part pattern, and a quarternary junction part pattern have an alpha-type junction part pattern and tertiary unit cells having a junction part pattern in which an alpha-type junction part pattern and a beta-type junction part pattern are each mixed and used in the secondary junction part pattern, or an example (lower example) in which a zero order unit cell which does not include an additional junction part pattern therein and tertiary unit cells in which an alpha-type junction part pattern and a beta-type junction part pattern are subsequently shown are present together.
Figure 7:
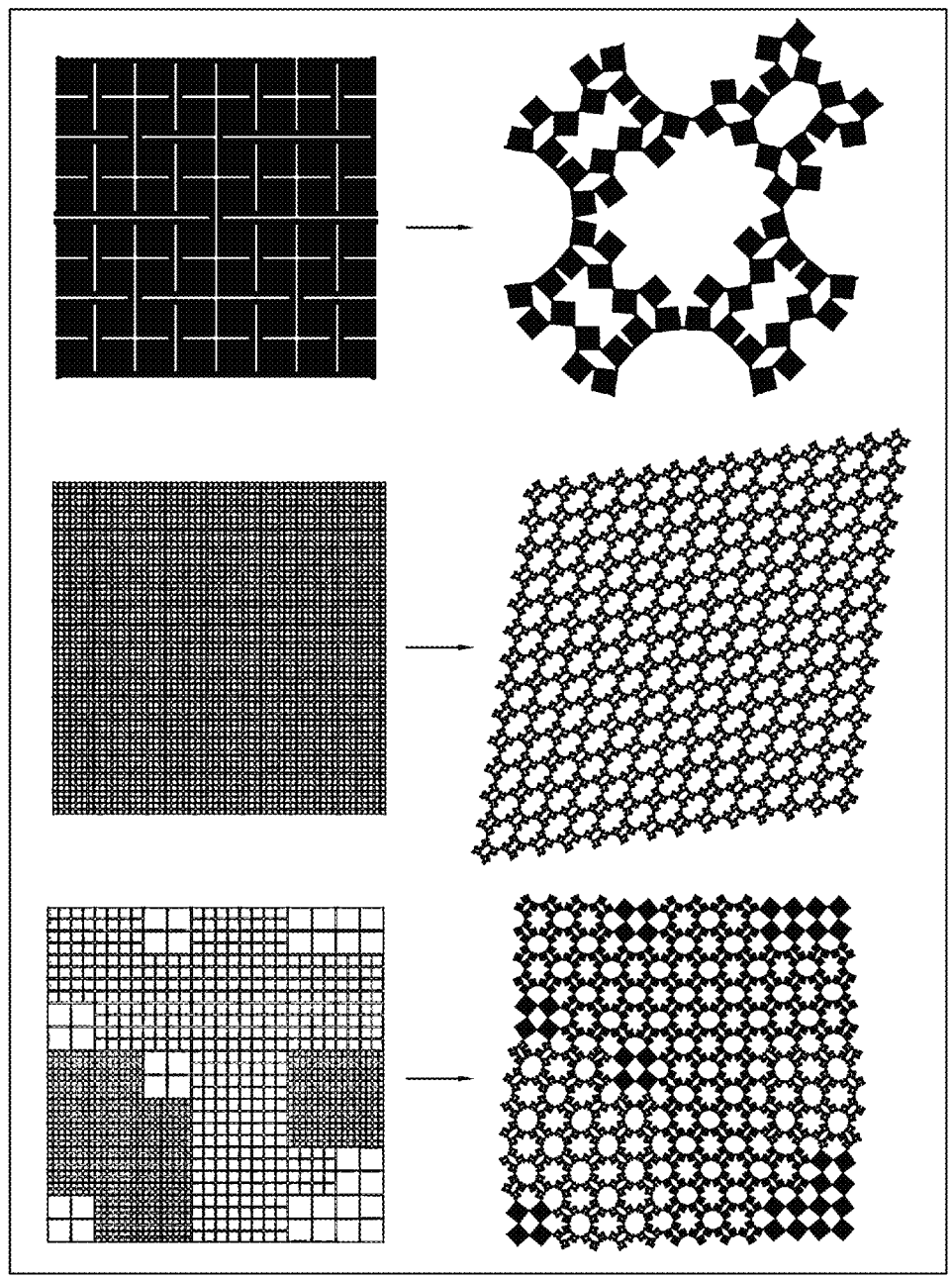
FIG. 7 is an example of an extremely deformable structure having an embedded form designed according to an exemplary embodiment of the present disclosure, and the three examples on the upper, middle, and lower portions are a view illustrating that the extremely deformable structure has a similar appearance in the latent state, but has different forms and areas in the active state according to what form the order of each hierarchical structure and the junction part pattern of each order have.

In the case of a stretching test, the extremely deformable structure according to the present disclosure corresponds to the upper drawing of FIG. 1, that is, the basic displacement unit has a tetragon, and the angle between the adjacent displacement bodies when the order was 1 in the case of m=4 became 90 degrees, which is the maximum angle between the two displacement bodies because the angle is gradually decreased as the order is increased. Accordingly, a test was performed by setting the extreme condition to 135 degrees. As a result, it was confirmed that the open-circuit voltage was constantly maintained in all the three tests.

All the tests were evaluated by adopting a stainless steel tube having a diameter of ⅛ inches as an axis based on the junction part.

FIG. 14 is photographs before and after the bending test, and a graph illustrating the change trend of the open-circuit voltage during the bending test performed 3,000 times. FIG. 15 is photographs before and after a stretching test in which a stainless steel tube having a diameter of ⅛ inches was adopted as an axis and one cell was rotated while the junction part was brought to face each other, and a graph illustrating a change in open-circuit voltage during the stretching test performed 3,000 times. The angle between the two basic displacement bodies was increased up to 135 degrees. FIG. 16 is photographs before and after the test in which a stainless steel tube having a diameter of ⅛ inches was adopted as an axis and one displacement body was rotated at 180 degrees based on the axis while the junction part was brought to face each other, that is, warping is totally formed, and a graph illustrating an open-circuit voltage during the warping test performed 3,000 times.

Figure 17:
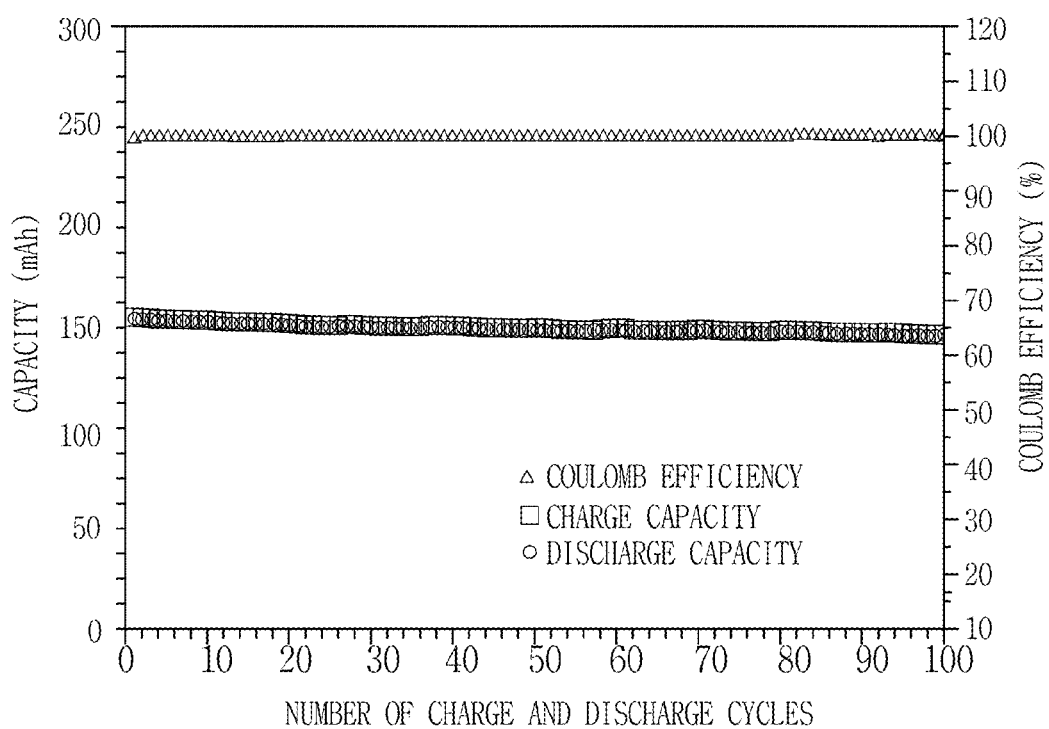
FIGS. 17, 18 and 19 are graphs illustrating electrochemical stability with respect to the mechanical stress of a lithium secondary battery having an extremely deformable structure, which is completely manufactured in FIG. 13. The device used has a working voltage range of 10 V to 16.8 V, and a theoretical capacity of 106.7 mAh based on a positive electrode active material.

The result that the evaluation of charge and discharge characteristics of the device completely manufactured in FIG. 13 was illustrated in FIG. 17. As can be seen from FIG. 17, it was confirmed that the first discharge capacity was 154.3 mAh and the 100th discharge capacity was 146.9 mAh, and the coulomb efficiency has a minimum value of 99.4%, a maximum value of 100.2%, and an average value of 99.9%. The capacity deterioration until the 100th times was 4.8%.

Figure 18:
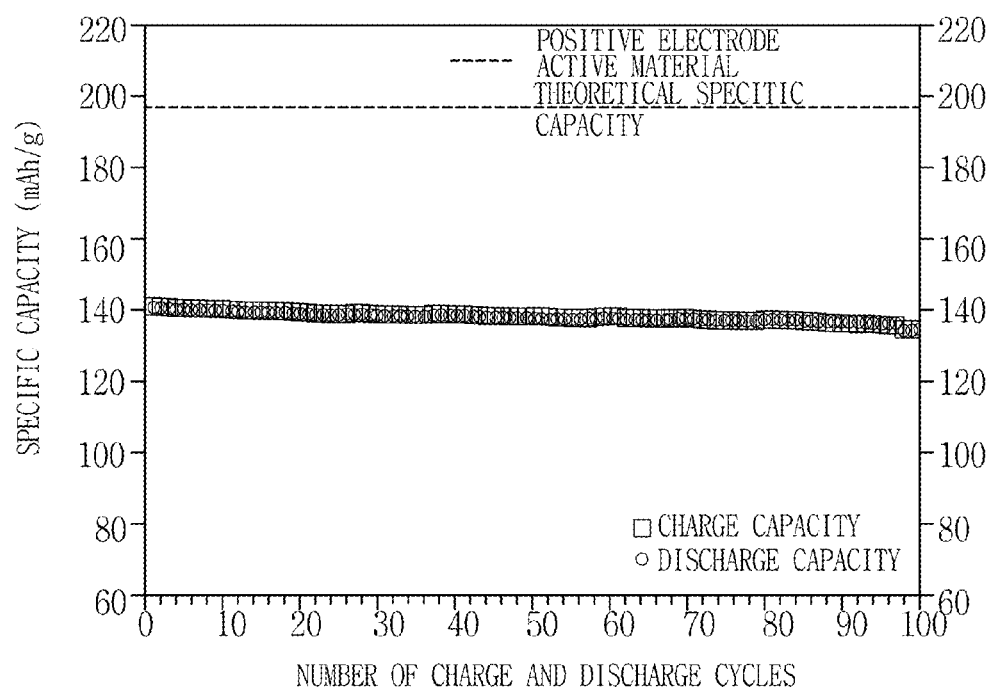
Figure 19:
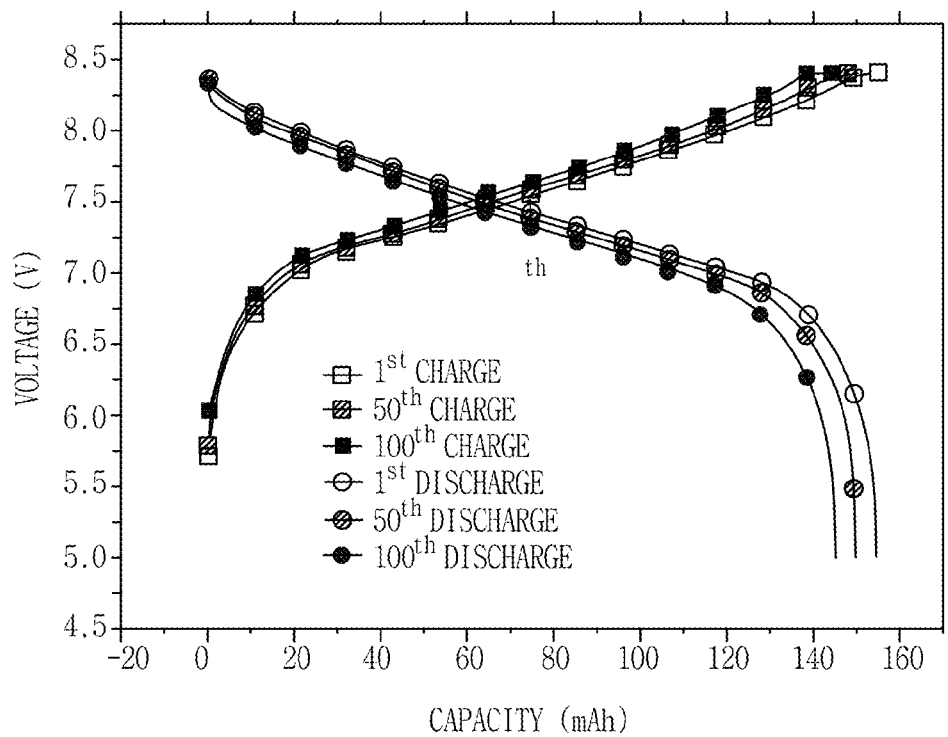

FIG. 18 is a view illustrating the change in weight specific capacity of the total positive electrode active material applied, and it was confirmed that the first discharge specific capacity was 142.5 mAh/g and the 100th discharge specific capacity was 135.7 mAh/g. FIG. 19 is a graph which may confirm the voltage range and the capacity change trend shown during the evaluation of the cycles of the lithium ion battery having an extremely deformable structure.

The results of evaluating stretchable, flexible and reversibly wrinkable characteristics of a lithium secondary battery having an extremely deformable structure are shown in FIG. 20.

Figure 20A:
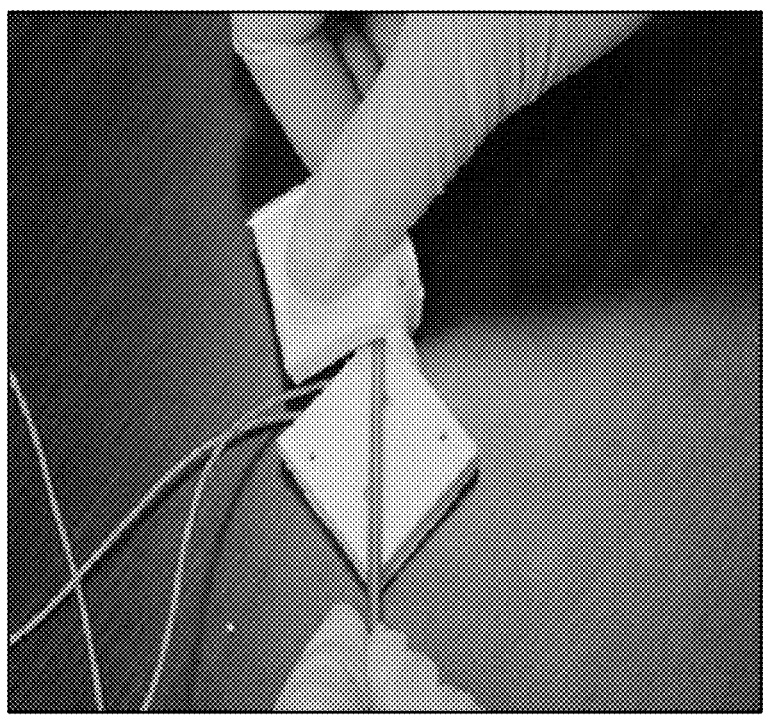
FIG. 20A is a photograph in which the extremely deformable structure was maximally expanded.
Figure 20B:
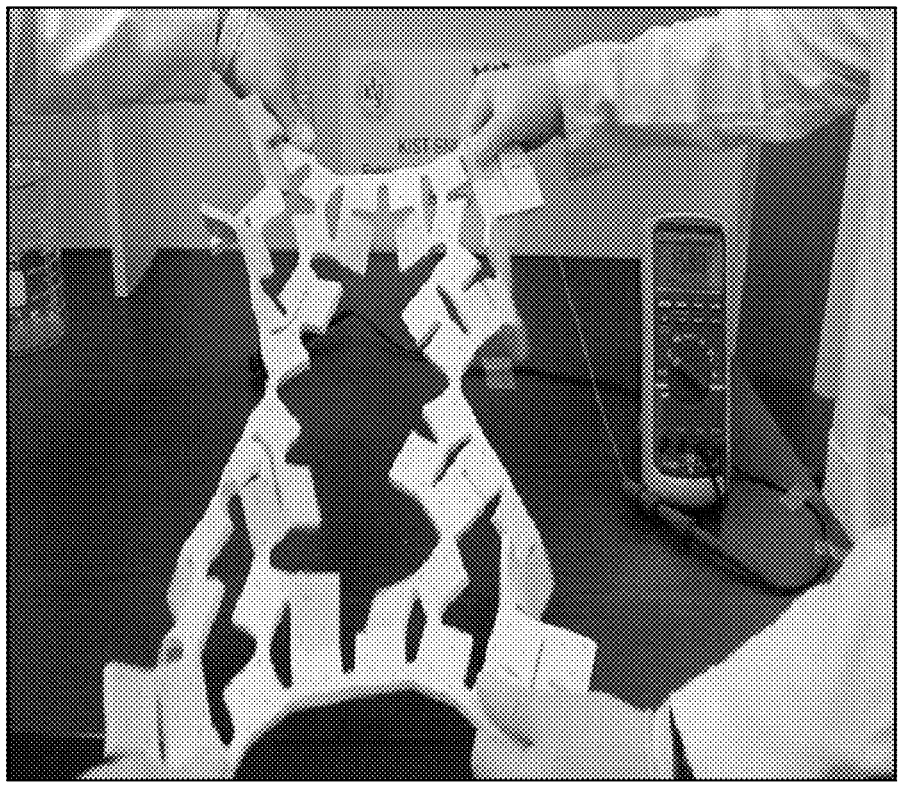
FIG. 20B is a photograph in which the extremely deformable structure was rolled by using a stick with a radius of curvature of 1 cm.
Figure 20C:
FIGS. 20 C and D are photographs of evaluating whether a flat lithium secondary battery was operated even while the battery was randomly bent, and placed into a beaker.
Figure 20D:

FIG. 20A is a photograph in which the extremely deformable structure was maximally expanded, FIG. 20B is a photograph in which the extremely deformable structure was rolled by using a stick with a radius of curvature of 1 cm, and FIGS. 20C and 20D are photographs of evaluating whether a flat lithium secondary battery was operated even while the battery was randomly bent, and placed into a beaker.

As can be clearly seen from the drawings, it could be confirmed that a lithium secondary battery having an extremely deformable structure could be normally operated even when the lithium secondary battery was maximally expanded, and randomly bent The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. An extremely deformable structure comprising a basic displacement unit having an embedded form, wherein m polygonal basic unit cells are disposed adjacent to each other, m separation parts are formed among the m basic unit cells, a junction part connecting the basic unit cells to each other is formed between the basic unit cells in which the junction part has a junction part pattern in which an external junction part disposed at an outer portion of the basic unit cell and an internal portion part which is not in contact with the outer portion of the basic unit cell are sequentially repeated, and the relative positions of the m basic unit cells are changed according to the junction part pattern, and thus are activated, wherein m is an integer of 4 or 6.

2. The extremely deformable structure of claim 1, wherein the extremely deformable structure includes a shape conversion material which is composed of a n-th order hierarchial structure comprising a (primary) displacement unit to an (n-th) order displacement unit, wherein n is an integer of 2 or more.

3. The extremely deformable structure of claim 2, wherein the (primary) displacement unit comprises m basic displacement units, m separation parts are formed among the m basic displacement units, a junction part connecting the basic displacement units to each other is formed among the basic displacement units, the junction part has a (primary) junction part pattern in which an external junction part disposed at the outer portion of the basic displacement unit and an internal junction part which is not in contact with the outer portion of the basic unit cell are subsequently repeated, and the relative positions of the m basic displacement units are changed depending on the junction part pattern.

4. The extremely deformable structure of claim 3, wherein the (n-th) order displacement unit comprises m (n−1th) order displacement units, m separation parts are formed among the m (n−1th) order displacement units, a junction part connecting the (n−1th) order displacement units to each other is formed among the (n−1th) order displacement units, the junction part has a (n-th) order junction part pattern in which an external junction part disposed at the outer portion of the (n−1th) order displacement unit and an internal junction part which is not in contact with the outer portion of the basic unit cell are subsequently repeated, and the relative positions of the m (n−1th) order displacement units are changed depending on the junction part pattern.

5. The extremely deformable structure of claim 4, wherein the junction part pattern of the displacement unit each has junction part$_1$ to junction part$_m$, each of the junction part$_1$ to junction part$_m$ has a junction part form selected from an external junction part and an internal junction part, and the junction parts adjacent to each other comprise an alpha-type junction part form which is different from junction part forms and a beta-type junction part form which has a junction part form opposite to the alpha-type junction form.

6. The extremely deformable structure of claim 5, wherein in the (primary) to (n-th) order displacement units, an alpha-type junction part pattern and a beta-type junction part pattern are subsequently alternately formed.

7. The extremely deformable structure of claim 1, wherein the unit cell and the junction part comprise any one material selected from the group consisting of silicone rubber, a polyester resin, hydrogel, a transition metal, a carbon fiber, and any combination thereof.

8. The extremely deformable structure of claim 1, wherein the junction part of the basic displacement unit is composed of a structure which is capable of making a 3-dimensional rotational movement.

9. The extremely deformable structure of claim 8, wherein the junction part has a hinge structure.

10. A lithium secondary battery comprising: a first unit; and an encapsulant which encapsulates the first unit, wherein the encapsulant is composed of the extremely deformable structure of claim 1.

11. The lithium secondary battery of claim 10, wherein the first nit comprises a positive electrode comprising a positive electrode active material and a positive electrode current collector, a negative electrode active material, and a negative electrode current collector, and comprises a negative electrode disposed so as to face the positive electrode, and a separation membrane provided between the positive electrode and the negative electrode.

12. A lithium secondary battery comprising a positive electrode active material, a negative electrode active material disposed so as to face the positive electrode active material, a separation membrane provided between the positive electrode active material and the negative electrode active material, and a positive electrode current collector and a negative electrode current collector provided at the outer side of each of the positive electrode active material and the negative electrode active material, wherein the positive electrode active material and the negative electrode active material are composed of the extremely deformable structure of claim 1.

* * * * *